US010698186B2

(12) United States Patent
Liu et al.

(10) Patent No.: US 10,698,186 B2
(45) Date of Patent: Jun. 30, 2020

(54) OPTICAL PHOTOGRAPHING LENS SYSTEM, IMAGE CAPTURING APPARATUS AND ELECTRONIC DEVICE

(71) Applicant: LARGAN PRECISION CO., LTD., Taichung (TW)

(72) Inventors: Ssu-Hsin Liu, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/376,171

(22) Filed: Apr. 5, 2019

(65) Prior Publication Data
US 2019/0235211 A1    Aug. 1, 2019

Related U.S. Application Data

(63) Continuation of application No. 15/589,096, filed on May 8, 2017, now Pat. No. 10,302,916.

(30) Foreign Application Priority Data

Dec. 15, 2016  (TW) .............................. 105141568 A

(51) Int. Cl.
*G02B 13/00*    (2006.01)

(52) U.S. Cl.
CPC ......... *G02B 13/008* (2013.01); *G02B 13/004* (2013.01)

(58) Field of Classification Search
CPC .......................... G02B 13/004; G02B 13/008
USPC ........................................................ 359/357
See application file for complete search history.

(56) References Cited

U.S. PATENT DOCUMENTS 7,277,238 B2 *  10/2007  Noda ................. G02B 9/34
                                                    359/715
2018/0024320 A1    1/2018  Asami et al.
2018/0024334 A1    1/2018  Asami et al.

FOREIGN PATENT DOCUMENTS

| CN | 105974559 A | 9/2016 |
| CN | 205910404 U | 1/2017 |
| CN | 106959500 A | 7/2017 |
| TW | 201725414 A | 7/2017 |

* cited by examiner

*Primary Examiner* — Thomas K Pham
*Assistant Examiner* — Mitchell T Oestreich
(74) *Attorney, Agent, or Firm* — Locke Lord LLP; Tim Tingkang Xia, Esq.

(57) ABSTRACT

The present disclosure provides an optical photographing lens system comprising four lens elements, the four lens elements being, in order from an object side to an image side: a first lens element with positive refractive power having an object-side surface being convex in a paraxial region thereof; a second lens element; a third lens element; and a fourth lens element with positive refractive power having an object-side surface being convex in a paraxial region thereof and an image-side surface being concave in a paraxial region thereof, the image-side surface of the fourth lens element having at least one convex critical point in an off-axial region thereof, both the object-side and the image-side surfaces thereof being aspheric.

20 Claims, 23 Drawing Sheets

OPTICAL PHOTOGRAPHING LENS SYSTEM, IMAGE CAPTURING APPARATUS AND ELECTRONIC DEVICE

RELATED APPLICATIONS

This application is a Continuation Application of U.S. application Ser. No. 15/589,096, filed on May 8, 2017, now approved and claims priority to Taiwan Application Serial Number 105141568, filed on Dec. 15, 2016, which is incorporated by reference herein in its entirety.

BACKGROUND

Technical Field

The present disclosure relates to an optical photographing lens system and an image capturing apparatus, and more particularly, to an optical photographing lens system and an image capturing apparatus applicable to electronic devices.

Description of Related Art

As technology improves, photographing modules are used in a wide variety of applications, but they are limited by environmental conditions easily. It is difficult for these modules to maintain good image quality in a low-light environment. In order to overcome lighting problems, photographing modules can be configured with large apertures. Nowadays, most electronic devices tend to be smaller, thinner and more multifunctional, so that needs for compact photographing modules are rising accordingly. Furthermore, the flourishing infrared technology such as motion capture has contributed to an increasing need for photographing modules applicable to infrared.

The distribution of refractive power in conventional optical systems is overly concentrated, thus making it difficult for these systems to overcome a low-light environment, achieve miniaturization of photographing modules, and meet the demands for optical systems applicable to infrared, simultaneously.

Thus, there is a need for a compact optical photographing lens system different from the conventional systems: one that is smaller, lighter and highly functional to be integrated into electronic devices, as well as applicable to infrared so as to be applied to the infrared technology of motion capture.

SUMMARY

According to one aspect of the present disclosure, an optical photographing lens system comprises four lens elements, the four lens elements being, in order from an object side to an image side: a first lens element with positive refractive power having an object-side surface being convex in a paraxial region thereof; a second lens element; a third lens element; and a fourth lens element with positive refractive power having an object-side surface being convex in a paraxial region thereof and an image-side surface being concave in a paraxial region thereof, the image-side surface of the fourth lens element having at least one convex critical point in an off-axial region thereof, both the object-side surface and the image-side surface thereof being aspheric; wherein a focal length of the first lens element and a focal length of the fourth lens element are shorter than a focal length of the second lens element and a focal length of the third lens element, a focal length of the optical photographing lens system is f, a composite focal length of the third lens element and the fourth lens element is f34, and the following condition is satisfied:

$$0.4 < f/f34 < 1.0.$$

According to another aspect of the present disclosure, an image capturing apparatus comprises the aforementioned optical photographing lens system, a driving apparatus and an image sensor.

According to still another aspect of the present disclosure, an electronic device comprises the aforementioned image capturing apparatus.

According to yet still another aspect of the present disclosure, an optical photographing lens system comprises four lens elements, the four lens elements being, in order from an object side to an image side: a first lens element with positive refractive power having an object-side surface being convex in a paraxial region thereof; a second lens element; a third lens element; and a fourth lens element with positive refractive power having an object-side surface being convex in a paraxial region thereof and an image-side surface being concave in a paraxial region thereof, the image-side surface of the fourth lens element having at least one convex critical point in an off-axial region thereof, both the object-side surface and the image-side surface thereof being aspheric; wherein a focal length of the first lens element and a focal length of the fourth lens element are shorter than a focal length of the second lens element and a focal length of the third lens element, a focal length of the optical photographing lens system is f, the focal length of the first lens element is f1, the focal length of the fourth lens element is f4, a central thickness of the second lens element is CT2, an axial distance between the second lens element and the third lens element is T23, and the following conditions are satisfied:

$$0 < f/f1 < 0.90;$$

$$0.20 < f/f4 < 0.90; \text{ and}$$

$$0.2 < CT2/T23 < 1.1.$$

DETAILED DESCRIPTION

Figure 1A:
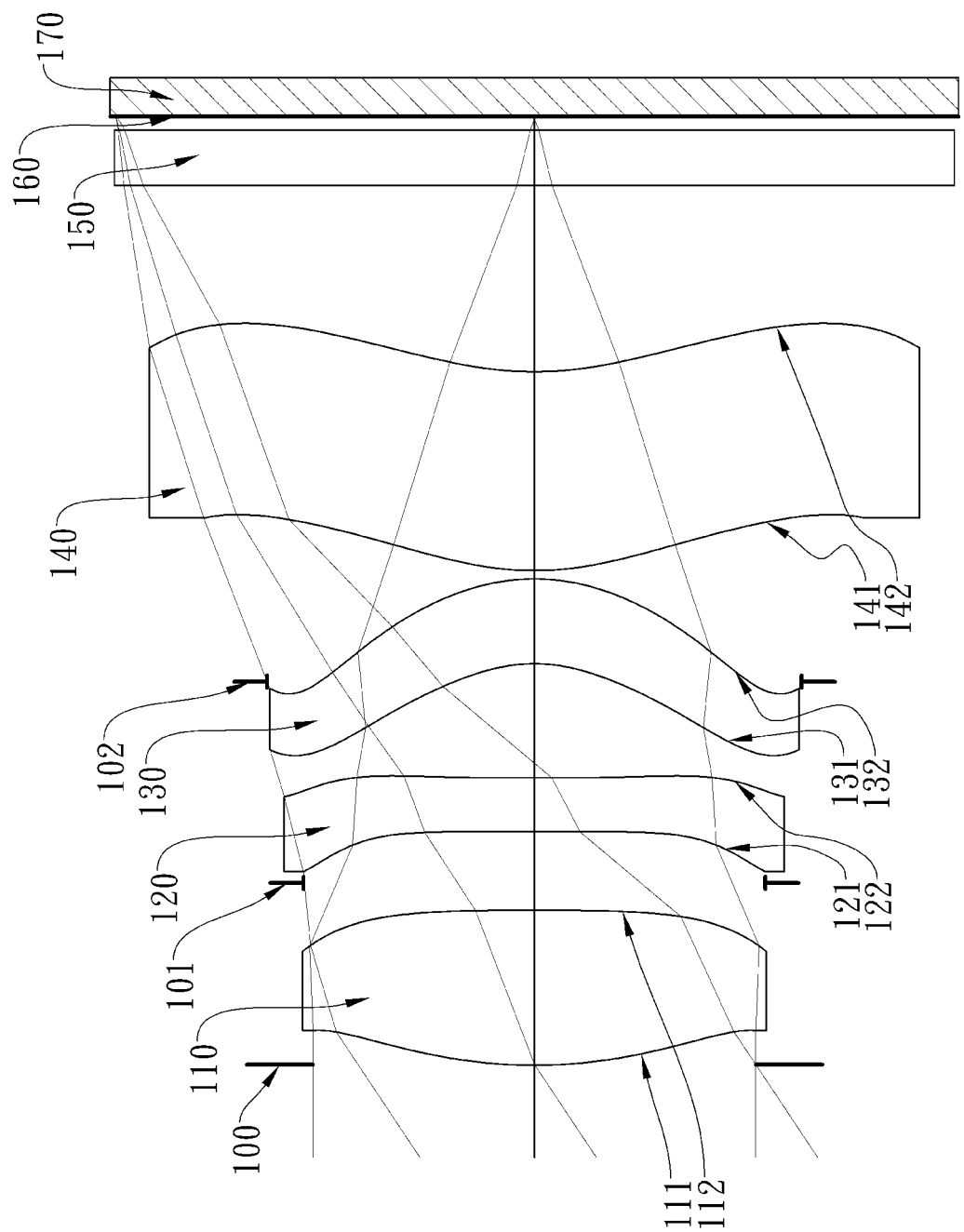
FIG. 1A is a schematic view of an image capturing apparatus according to the 1st embodiment of the present disclosure.

The present disclosure provides an optical photographing lens system comprising four lens elements. The four lens elements are, from an object side to an image side, a first lens element, a second lens element, a third lens element and a fourth lens element.

With a focal length of the first lens element and a focal length of the fourth lens element being shorter than a focal length of the second lens element and a focal length of the third lens element, the optical photographing lens system can effectively distribute refractive power to reduce spherical aberrations and field curvature generated by the optical photographing lens system, and to decrease the sensitivity of each lens thereof to manufacturing tolerances, thereby improving the molding yield rate.

Also, for large aperture designs, the refractive power thereof is concentrated on the first lens element and the fourth lens element, with a configuration of the second lens element and the third lens element to correct aberrations at the image periphery. As a result, the surfaces of the lens elements are not overly curved, thereby reducing the molding difficulty and the effect of manufacturing tolerances on image quality.

The first lens element has positive refractive power. This feature can concentrate the convergence capability at the object side of the optical photographing lens system. Consequently, the size of the optical photographing lens system can be effectively controlled, so as to improve the portability. The first lens element has an object-side surface being convex in a paraxial region thereof and is favorable for proper distribution of positive refractive power, while further improving the miniaturization of the optical photographing lens system accordingly.

The second lens element may have an object-side surface being convex in a paraxial region thereof and is favorable for reducing aberrations generated by the first lens element, including astigmatism. Furthermore, both the object-side and image-side surfaces of the second lens element may have at least one inflection point, respectively, so as to favorably shorten the total track length of the optical photographing lens system and increase the area of the image surface, while reducing the outer diameter of the system to achieve the miniaturization of the optical photographing lens system. It is more important to satisfy this condition when the optical photographing lens system is applied to the infrared, as it is harder for light refraction in the infrared with a smaller refractive index of a lens element than that in the visible.

The third lens element may have an image-side surface being convex in a paraxial region thereof, and the image-side surface of the third lens element may have at least one concave critical point in an off-axial region thereof. These features can correct off-axis aberrations and increase the area of the image surface, while further providing the peripheral shape of the fourth lens element with enough freedom to correct off-axis aberrations as well as maintain the relative illumination on the periphery of the image surface. These features can further provide the periphery with enough space for an installation of shading elements to improve peripheral image quality and system stability.

The fourth lens element has positive refractive power for distributing the positive refractive power of within the lens system, thereby preventing the first lens element from having an overly strong refractive power, and consequently, reducing spherical aberrations. The fourth lens element has an object-side surface being convex in a paraxial region thereof and an image-side surface being concave in a paraxial region thereof, and the image-side surface of the fourth lens element has at least one convex critical point in an off-axial region thereof. These features can reduce astigmatism and field curvature generated by the system in an off-axial region, and can further reduce aberrations in cooperation with the shape of the third lens element.

When a focal length of the optical photographing lens system is f, a composite focal length of the third lens element and the fourth lens element is f34, and the following condition is satisfied: $0.4<f/f34<1.0$, it can configure the third lens element and fourth lens element with appropriate refractive power to acquire a balance between the increase of the image surface and the reduction of the incident angle of peripheral light.

When the focal length of the optical photographing lens system is f, the focal length of the first lens element is f1, the focal length of the fourth lens element is f4, and the following conditions are satisfied: $0<f/f1<0.90$ and $0.20<f/f4<0.90$, they can ensure that the refractive power of each single lens element is not overly strong and falls within an appropriate range, in order to reduce aberrations generated by the system, including spherical aberrations.

When a central thickness of the second lens element is CT2, an axial distance between the second lens element and the third lens element is T23, and the following condition is satisfied: 0.2<CT2/T23<1.1, it can ensure that the thickness of the second lens element falls within an appropriate range in order to correct the aberrations generated by the first lens element, and that there exists appropriate spacing between the second lens element and the third lens element in order to correct aberrations including field curvature in an off-axial region.

When a central thickness of the first lens element is CT1, a central thickness of the fourth lens element is CT4, and the following condition is satisfied: 0.2<CT1/CT4<1.2, it can ensure an appropriate ratio of the thickness of the first lens element to that of the fourth lens element in order to correct aberrations including spherical aberrations.

When the central thickness of the second lens element is CT2, an axial distance between the first lens element and the second lens element is T12, and the following condition is satisfied: 0.1<CT2/T12<1.2, it can ensure that the thickness of the second lens element falls within an appropriate range, and can provide proper spacing between the first lens element and the second lens element, thereby maintaining peripheral image quality as the aperture enlarges and increasing the area of the image surface.

When a curvature radius of the image-side surface of the third lens element is R6, a curvature radius of the object-side surface of the fourth lens element is R7, and the following condition is satisfied: −2.5<R6/R7<0, it is favorable for controlling the peripheral shapes of the third lens element and the fourth lens element in order to correct off-axis astigmatism and field curvature, and it can also increase the area of the image surface.

When the axial distance between the first lens element and the second lens element is T12, the axial distance between the second lens element and the third lens element is T23, and the following condition is satisfied: 0.25<T12/T23<1.60, it is favorable for adjusting the ratio of the axial distances between the first lens element and the second lens element to that between the second lens element and the third lens element within an appropriate range, in order to reduce aberrations and to shorten the total track length of the optical photographing lens system. When the focal length of the optical photographing lens system is f, the focal length of the first lens element is f1, the focal length of the second lens element is f2, the focal length of the third lens element is f3, the focal length of the fourth lens element is f4, and the following condition is satisfied: 0<(f/|f2|+f/|f3|)/(f/f1+f/f4)<0.40, 0.40, it can prevent the refractive power of the second lens element and the third lens element from being overly strong, so as to increase the angle of view and the area of the image surface of the optical photographing lens system. It can also ensure that the first lens element and the fourth lens element provide the system with sufficient positive refractive power to converge light rays in order to shorten the total track length of the optical photographing lens system.

When the curvature radius of the object-side surface of the fourth lens element is R7, a curvature radius of the image-side surface of the fourth lens element is R8, and the following condition is satisfied: −100<(R7+R8)/(R7−R8)<−1.50, it can provide the peripheral shape of the fourth lens element with sufficient freedom to correct off-axis aberrations as well as increase the area of the image surface.

When a curvature radius of an object-side surface of the third lens element is R5, the curvature radius of the image-side surface of the third lens element is R6, and the following condition is satisfied: −0.28<(R5−R6)/(R5+R6)<0.24, it can provide the peripheral shape of the third lens element with sufficient freedom to correct off-axis aberrations as well as increase the area of the image surface. Furthermore, it can also correct aberrations generated by the first lens element and the second lens element and increase the area of the image surface while maintaining the relative illumination on the periphery of the image surface by cooperation between the third lens element and the fourth lens element.

When the focal length of the first lens element is f1, the focal length of the fourth lens element is f4, and the following condition is satisfied: 0.25<f1/f4<1.33, it can ensure that the refractive power of the first lens element falls within an appropriate range, so as to avoid an overproduction of the spherical aberration while increasing the angle of view. It can also, in cooperation with appropriate refractive power of the fourth lens element, acquire an appropriate balance between the correction of aberrations of the system and the increase of the area of the image surface.

When the focal length of the third lens element is f3, the focal length of the fourth lens element is f4, and the following condition is satisfied: 0<f4/|f3|<0.45, it can appropriately distribute the refractive power of the third lens element and the fourth lens element, so as to acquire an appropriate balance between the increase of the area of the image surface and the maintenance of the relative illumination on the periphery of the image surface.

When an f-number of the optical photographing lens system is Fno, and the following condition is satisfied: 0.8<Fno<2.0, it can enable an image capturing apparatus comprising the optical photographing lens system to obtain sufficient information under restrictions such as low-light conditions in night photography, high-contrast lighting conditions in bright light photography, or short exposure time in dynamic photography, thereby expanding the fields of application of a functional electronic device comprising the optical photographing lens system. It is more important to satisfy this condition to enlarge the image surface when the optical photographing lens system is applied to the infrared, as it is harder for light refraction in the infrared with a smaller refractive index of a lens element than that in the visible.

The optical photographing lens system may be applicable to infrared wavelengths ranging from 780.0 nm to 1100.0 nm, and may be used for infrared photography, motion capture and other purposes. In motion capture applications, the system can be used on smart phones, smart appliances, video game consoles and other electronic devices to implement human-computer interaction mechanisms. Furthermore, motion capture technology can be used in photography to provide a reference for focusing or adjusting captured images.

When a composite focal length of the first lens element and the second lens element is f12, the composite focal length of the third lens element and the fourth lens element is f34, and the following condition is satisfied: 0.40<f34/f12<1.80, it can further distribute the refractive power within the lens system, in order to reduce spherical aberrations and field curvature generated by the optical photographing lens system, and to reduce the sensitivity of each lens element to manufacturing tolerances.

When an entrance pupil diameter of the optical photographing lens system is EPD, the central thickness of the second lens element is CT2, and the following condition is satisfied: 7.0<EPD/CT2<20.0, it can effectively increase the amount of incident light of the optical photographing lens system to expand the fields of application of a functional electronic device comprising the optical photographing lens system. Furthermore, when the above condition is satisfied in the infrared, it is favorable for increasing the area of the image surface. It can also restrain the thickness of the second lens element from becoming overly thin in order to reduce the difficulty in lens manufacturing and to increase the molding yield rate while adjusting the second lens element for an appropriate thickness so as to correct aberrations generated by the first lens element, including spherical aberrations.

According to the optical photographing lens system of the present disclosure, the lens elements thereof can be made of glass or plastic. When the lens elements are made of glass, the distribution of the refractive power of the optical photographing lens system is more flexible to design. When the lens elements are made of plastic, the manufacturing cost can be effectively reduced. Furthermore, surfaces of each lens element can be arranged to be aspheric (ASP). As aspheric surfaces can be easily formed into shapes other than spherical shapes, more controllable variables can be obtained to eliminate aberrations and to further decrease the required number of lens elements, and consequently, the total track length of the optical photographing lens system can be effectively reduced.

According to the optical photographing lens system of the present disclosure, the optical photographing lens system can include at least one stop, such as an aperture stop, a glare stop or a field stop, so as to favorably reduce the amount of stray light and thereby to improve the image quality.

According to the optical photographing lens system of the present disclosure, a stop can be configured as a front stop or a middle stop. A front stop disposed between an imaged object and the first lens element can provide a longer distance between an exit pupil of the optical photographing lens system and the image surface, so that the generated telecentric effect can improve the image-sensing efficiency of an image sensor, such as a CCD or CMOS sensor. A middle stop disposed between the first lens element and the image surface is favorable for enlarging the field of view of the optical photographing lens system, thereby providing the optical photographing lens system with the advantages of a wide-angle lens.

According to the optical photographing lens system of the present disclosure, when the lens element has a convex surface and the region of convex shape is not defined, it indicates that the surface can be convex in the paraxial region thereof when the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the optical photographing lens system of the present disclosure, the image surface of the optical photographing lens system, based on the corresponding image sensor, can be a plane or a curved surface with any curvature, especially a curved surface being concave facing towards the object side.

According to the above description of the present disclosure, the following 1st-12th specific embodiments and the corresponding figures thereof are provided for further explanation.

1st Embodiment

Figure 1B:
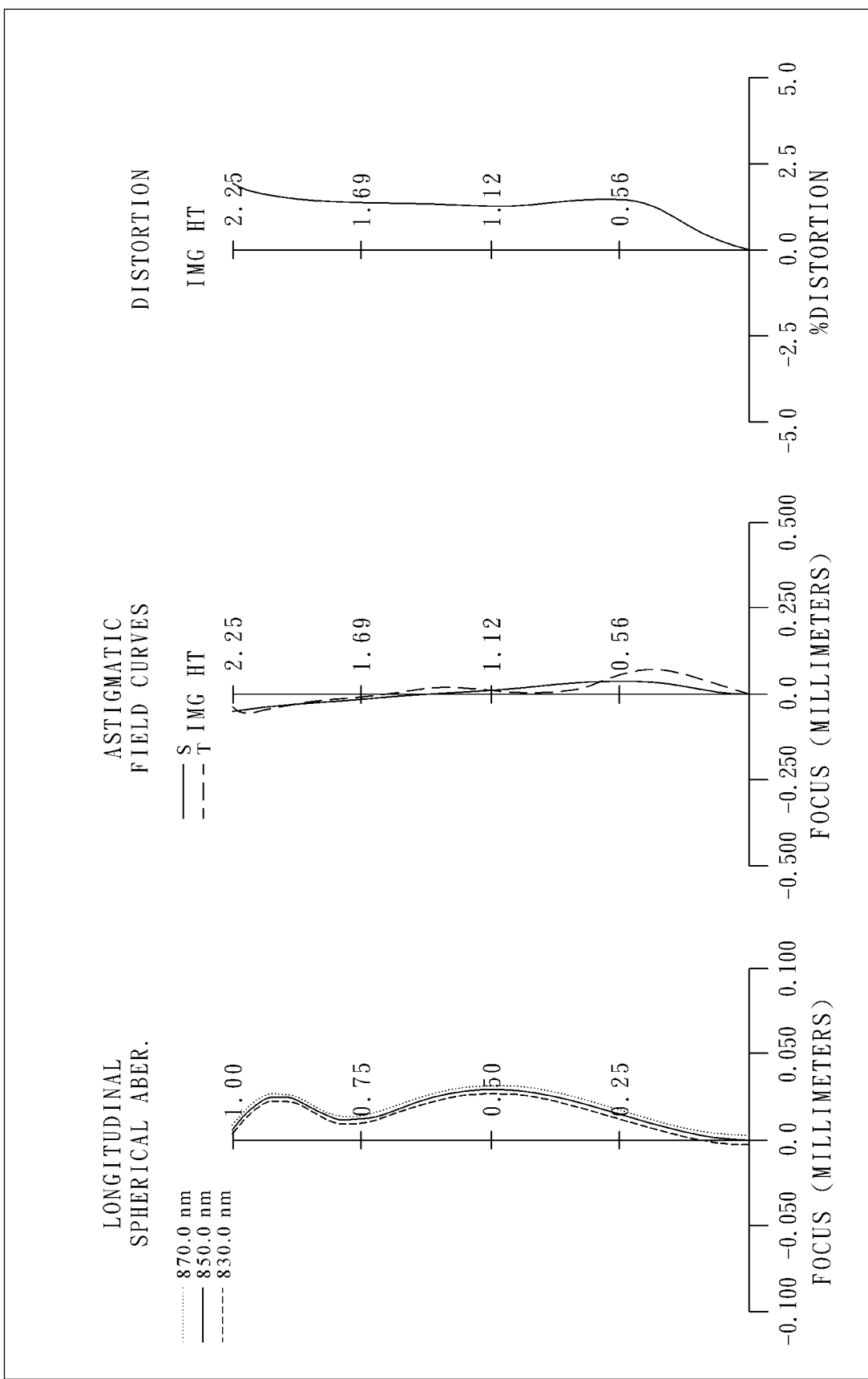
FIG. 1B shows longitudinal spherical aberration curves, astigmatic field curves and a distortion curve of the image capturing apparatus according to the 1st embodiment.

FIG. 1A is a schematic view of an image capturing apparatus according to the 1st embodiment of the present disclosure. FIG. 1B shows, in order from left to right, longitudinal spherical aberration curves, astigmatic field curves and a distortion curve of the image capturing apparatus according to the 1st embodiment.

In FIG. 1A, the image capturing apparatus comprises an optical photographing lens system (not otherwise herein labeled) of the present disclosure and an image sensor 170. The optical photographing lens system comprises, in order from an object side to an image side, an aperture stop 100, a first lens element 110, a stop 101, a second lens element 120, a third lens element 130, a stop 102, a fourth lens element 140, a filter 150 and an image surface 160, wherein the optical photographing lens system comprises four lens elements (110-140) with no additional lens element disposed between the first lens element 110 and the fourth lens element 140.

The first lens element 110 with positive refractive power has an object-side surface 111 being convex in a paraxial region thereof and an image-side surface 112 being convex in a paraxial region thereof, which are both aspheric, and the first lens element 110 is made of plastic.

The second lens element 120 with negative refractive power has an object-side surface 121 being concave in a paraxial region thereof and an image-side surface 122 being concave in a paraxial region thereof, which are both aspheric, and the second lens element 120 is made of plastic. Moreover, both the object-side surface 121 and the image-side surface 122 have at least one inflection point, respectively.

The third lens element 130 with negative refractive power has an object-side surface 131 being concave in a paraxial region thereof and an image-side surface 132 being convex in a paraxial region thereof, which are both aspheric, and the third lens element 130 is made of plastic. Moreover, the image-side surface 132 has at least one concave critical point in an off-axial region.

The fourth lens element 140 with positive refractive power has an object-side surface 141 being convex in a paraxial region thereof and an image-side surface 142 being concave in a paraxial region thereof, which are both aspheric, and the fourth lens element 140 is made of plastic. Moreover, the image-side surface 142 has at least one convex critical point in an off-axial region.

The filter 150 is located between the fourth lens element 140 and the image surface 160. The filter 150 is made of glass and does not affect the focal length of the optical photographing lens system. The image sensor 170 is disposed on or near the image surface 160 of the optical photographing lens system.

Moreover, a focal length of the first lens element 110 and a focal length of the fourth lens element 140 are both shorter than a focal length of the second lens element 120 and a focal length of the third lens element 130.

The detailed optical data of the 1st embodiment are shown in TABLE 1, wherein the units of the curvature radius, the thickness and the focal length are expressed in mm, and surfaces #0 to #14 refer to the surfaces in order from the object side to the image side. The aspheric surface data of the 1st embodiment are shown in TABLE 2, wherein k is the conic coefficient in the equation of the aspheric surface profiles, and A4-A16 refer to the 4th to 16th order aspheric coefficients. Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment; explanations in this regard will not be provided again.

TABLE 1

(1st Embodiment)
f = 3.31 mm, Fno = 1.39, HFOV = 33.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.003 | | | | |
| 2 | Lens 1 | 2.645 | ASP | 0.833 | Plastic | 1.548 | 40.4 | 4.35 |
| 3 | | −21.655 | ASP | 0.147 | | | | |
| 4 | Stop | Plano | | 0.274 | | | | |
| 5 | Lens 2 | −95.238 | ASP | 0.290 | Plastic | 1.647 | 19.5 | −88.30 |
| 6 | | 142.857 | ASP | 0.615 | | | | |
| 7 | Lens 3 | −0.833 | ASP | 0.456 | Plastic | 1.548 | 40.4 | −23.66 |
| 8 | | −1.062 | ASP | −0.553 | | | | |
| 9 | Stop | Plano | | 0.597 | | | | |
| 10 | Lens 4 | 1.546 | ASP | 1.069 | Plastic | 1.647 | 19.5 | 6.42 |
| 11 | | 1.792 | ASP | 1.000 | | | | |
| 12 | Filter | Plano | | 0.300 | Glass | 1.510 | 64.2 | — |
| 13 | | Plano | | 0.072 | | | | |
| 14 | Image | Plano | | — | | | | |

Note:
Reference wavelength is 850.0 nm.
The effective radius on surface #4 is 1.240 mm.
The effective radius on surface #9 is 1.435 mm

TABLE 2

Aspheric Coefficients

| Surface # | 2 | 3 | 5 | 6 |
|---|---|---|---|---|
| k = | −9.1547E+00 | −2.3073E+01 | 6.0000E+00 | 2.0000E+00 |
| A4 = | 4.6806E−02 | −2.4862E−02 | 7.0417E−02 | 1.1148E−01 |
| A6 = | −3.0515E−02 | −5.5807E−02 | −3.2037E−01 | −2.0553E−01 |
| A8 = | −1.0229E−02 | 2.6331E−02 | 3.5737E−01 | 9.4106E−02 |
| A10 = | 1.5433E−02 | −9.4641E−03 | −2.9721E−01 | 5.5746E−01 |
| A12 = | −8.9775E−03 | 9.9636E−04 | 1.3723E−01 | −1.0938E−01 |
| A14 = | 1.1879E−06 | −2.8657E−06 | −2.2846E−02 | 5.6059E−02 |
| A16 = | | | | −9.2752E−03 |

| Surface # | 7 | 8 | 10 | 11 |
|---|---|---|---|---|
| k = | −9.9970E−01 | −6.0180E−01 | −1.9751E+00 | −6.3848E−01 |
| A4 = | 5.1892E−01 | 1.8112E−01 | −1.4915E−01 | −1.4883E−01 |
| A6 = | −7.2258E−01 | −3.4049E−01 | 8.4969E−02 | 6.4422E−02 |
| A8 = | 6.4627E−01 | 5.5632E−01 | −3.3056E−02 | −2.6382E−02 |
| A10 = | −3.1417E−01 | −5.5749E−01 | 6.4685E−03 | 6.8338E−03 |
| A12 = | 8.5786E−02 | 3.3579E−01 | 6.3911E−06 | −1.0090E−03 |
| A14 = | −1.0773E−02 | −1.0072E−01 | −2.5169E−04 | 6.3391E−05 |
| A16 = | 1.6366E−04 | 1.1588E−02 | 3.2199E−05 | −1.0794E−07 |

The equation of the aspheric surface profiles is expressed as follows:

$$X(Y) = (Y^2/R)/(1 + \text{sqrt}(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the optical photographing lens system is f, an f-number of the optical photographing lens system is Fno, half of a maximum field of view of the optical photographing lens system is HFOV, and these parameters have the following values: f=3.31 mm; Fno=1.39; HFOV=33.6 degrees.

In the 1st embodiment, a central thickness of the first lens element 110 is CT1, a central thickness of the fourth lens element 140 is CT4, and they satisfy the condition: CT1/CT4=0.78.

In the 1st embodiment, a central thickness of the second lens element 120 is CT2, an axial distance between the first lens element 110 and the second lens element 120 is T12, and they satisfy the condition: CT2/T12=0.69.

In the 1st embodiment, the central thickness of the second lens element 120 is CT2, an axial distance between the second lens element 120 and the third lens element 130 is T23, and they satisfy the condition: CT2/T23=0.47.

In the 1st embodiment, the axial distance between the first lens element 110 and the second lens element 120 is T12, the axial distance between the second lens element 120 and the third lens element 130 is T23, and they satisfy the condition: T12/T23=0.68.

In the 1st embodiment, a curvature radius of the object-side surface 131 of the third lens element 130 is R5, a curvature radius of the image-side surface 132 of the third lens element 130 is R6, and they satisfy the condition: (R5−R6)/(R5+R6)=−0.12.

In the 1st embodiment, the curvature radius of the image-side surface 132 of the third lens element 130 is R6, a curvature radius of the object-side surface 141 of the fourth lens element 140 is R7, and they satisfy the condition: R6/R7=−0.69.

In the 1st embodiment, the curvature radius of the object-side surface 141 of the fourth lens element 140 is R7, a curvature radius of the image-side surface 142 of the fourth lens element 140 is R8, and they satisfy the condition: (R7+R8)/(R7−R8)=−13.53.

In the 1st embodiment, the focal length of the optical photographing lens system is f, the focal length of the first lens element 110 is f1, and they satisfy the condition: f/f1=0.76.

In the 1st embodiment, the focal length of the optical photographing lens system is f, the focal length of the first lens element 110 is f1, the focal length of the second lens element 120 is f2, the focal length of the third lens element 130 is f3, the focal length of the fourth lens element 140 is f4, and they satisfy the condition: (f/|f2|+f/|f3|)/(f/f1+f/f4)=0.14.

In the 1st embodiment, the focal length of the optical photographing lens system is f, a composite focal length of the third lens element 130 and the fourth lens element 140 is f34, and they satisfy the condition: f/f34=0.44.

In the 1st embodiment, the focal length of the optical photographing lens system is f, the focal length of the fourth lens element 140 is f4, and they satisfy the condition: f/f4=0.52.

In the 1st embodiment, the focal length of the first lens element 110 is f1, the focal length of the fourth lens element 140 is f4, and they satisfy the condition: f1/f4=0.68.

In the 1st embodiment, a composite focal length of the first lens element 110 and the second lens element 120 is f12, the composite focal length of the third lens element 130 and the fourth lens element 140 is f34, and they satisfy the condition: f34/f12=1.65.

In the 1st embodiment, the focal length of the third lens element 130 is f3, the focal length of the fourth lens element 140 is f4, and they satisfy the condition: f4/|f3|=0.27.

In the 1st embodiment, an entrance pupil diameter of the optical photographing lens system is EPD, the central thickness of the second lens element 120 is CT2, and they satisfy the condition: EPD/CT2=8.20.

2nd Embodiment

Figure 2A:
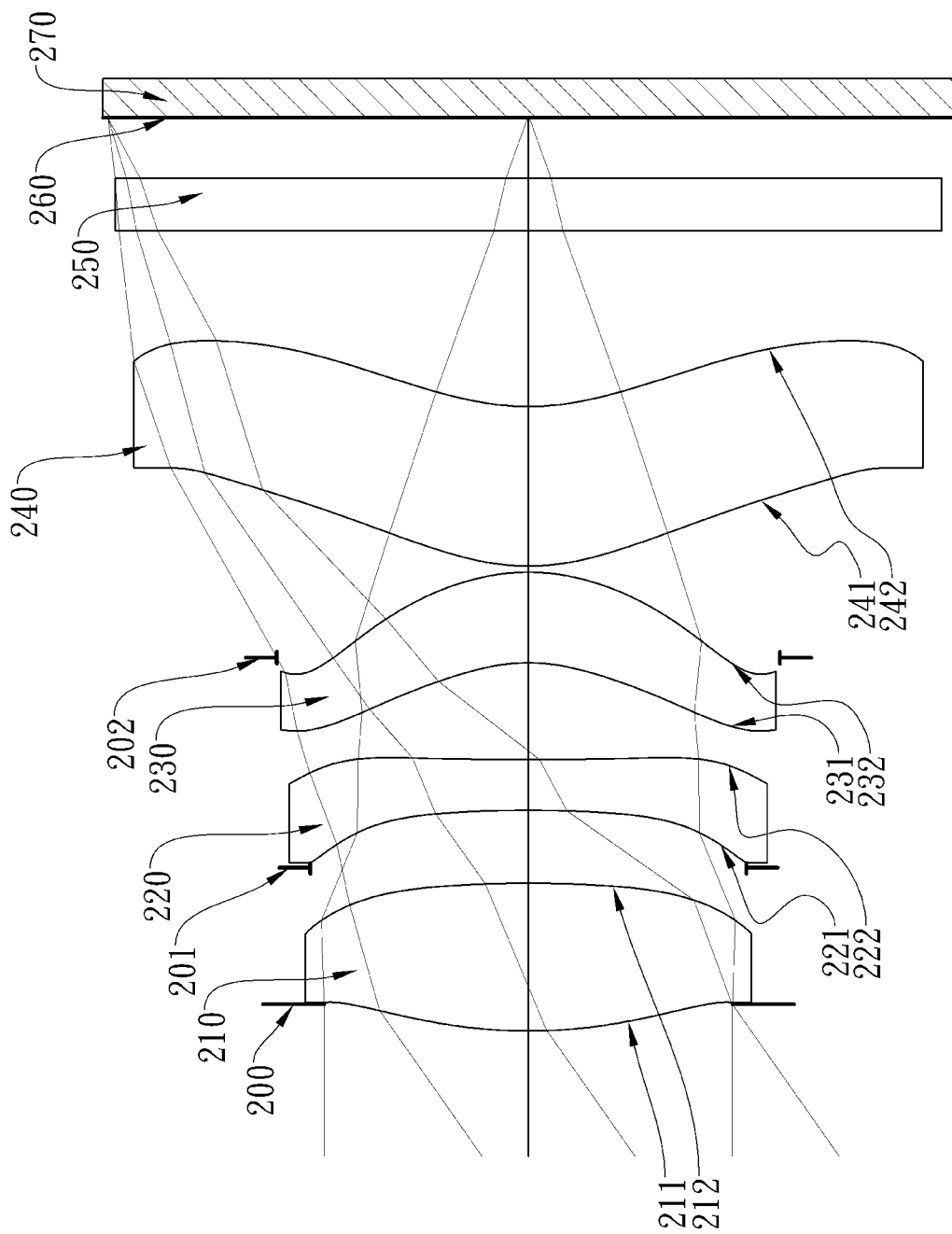
FIG. 2A is a schematic view of an image capturing apparatus according to the 2nd embodiment of the present disclosure.
Figure 2B:
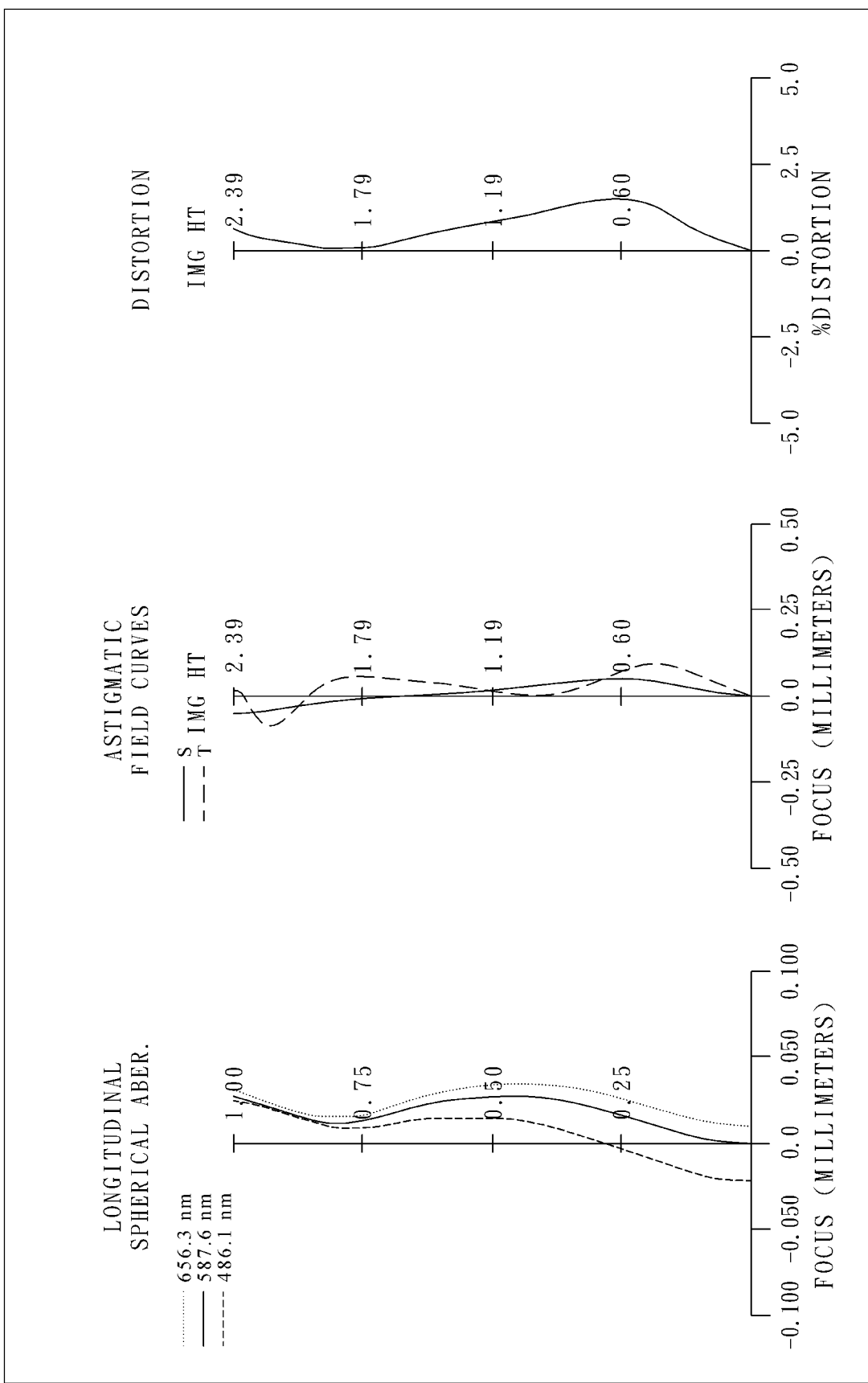
FIG. 2B shows longitudinal spherical aberration curves, astigmatic field curves and a distortion curve of the image capturing apparatus according to the 2nd embodiment.

FIG. 2A is a schematic view of an image capturing apparatus according to the 2nd embodiment of the present disclosure. FIG. 2B shows, in order from left to right, longitudinal spherical aberration curves, astigmatic field curves and a distortion curve of the image capturing apparatus according to the 2nd embodiment.

In FIG. 2A, an image capturing apparatus comprises an optical photographing lens system (not otherwise herein labeled) of the present disclosure and an image sensor 270. The optical photographing lens system comprises, in order from an object side to an image side, an aperture stop 200, a first lens element 210, a stop 201, a second lens element 220, a third lens element 230, a stop 202, a fourth lens element 240, a filter 250 and an image surface 260, wherein the optical photographing lens system comprises four lens elements (210-240) with no additional lens element disposed between the first lens element 210 and the fourth lens element 240.

The first lens element 210 with positive refractive power has an object-side surface 211 being convex in a paraxial region thereof and an image-side surface 212 being convex in a paraxial region thereof, which are both aspheric, and the first lens element 210 is made of plastic.

The second lens element 220 with negative refractive power has an object-side surface 221 being concave in a paraxial region thereof and an image-side surface 222 being convex in a paraxial region thereof, which are both aspheric, and the second lens element 220 is made of plastic. Moreover, both the object-side surface 221 and the image-side surface 222 have at least one inflection point, respectively.

The third lens element 230 with positive refractive power has an object-side surface 231 being concave in a paraxial region thereof and an image-side surface 232 being convex in a paraxial region thereof, which are both aspheric, and the third lens element 230 is made of plastic. Moreover, the image-side surface 232 has at least one concave critical point in an off-axial region.

The fourth lens element 240 with positive refractive power has an object-side surface 241 being convex in a paraxial region thereof and an image-side surface 242 being concave in a paraxial region thereof, which are both aspheric, and the fourth lens element 240 is made of plastic. Moreover, the image-side surface 242 has at least one convex critical point in an off-axial region.

The filter 250 is located between the fourth lens element 240 and the image surface 260. The filter 250 is made of glass and does not affect the focal length of the optical photographing lens system. The image sensor 270 is disposed on or near the image surface 260 of the optical photographing lens system.

Also, a focal length of the first lens element 210 and a focal length of the fourth lens element 240 are both shorter than a focal length of the second lens element 220 and a focal length of the third lens element 230.

The detailed optical data of the 2nd embodiment are shown in TABLE 3, and the aspheric surface data of the 2nd embodiment are shown in TABLE 4.

TABLE 3

(2nd Embodiment)
f = 3.37 mm, Fno = 1.45, HFOV = 35.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.151 | | | | |
| 2 | Lens 1 | 2.876 | ASP | 0.840 | Plastic | 1.544 | 55.9 | 4.02 |
| 3 | | −8.196 | ASP | 0.089 | | | | |

TABLE 3-continued (2nd Embodiment)
f = 3.37 mm, Fno = 1.45, HFOV = 35.1 deg.

| Surface # | | Curvature Radius | | Thickness | Material | Index | Abbe # | Focal Length |
|---|---|---|---|---|---|---|---|---|
| 4 | Stop | Plano | | 0.326 | | | | |
| 5 | Lens 2 | −7.058 | ASP | 0.290 | Plastic | 1.671 | 19.5 | −10.85 |
| 6 | | −236.977 | ASP | 0.551 | | | | |
| 7 | Lens 3 | −0.995 | ASP | 0.515 | Plastic | 1.544 | 55.9 | 160.09 |
| 8 | | −1.163 | ASP | −0.487 | | | | |
| 9 | Stop | Plano | | 0.522 | | | | |
| 10 | Lens 4 | 1.261 | ASP | 0.908 | Plastic | 1.544 | 55.9 | 6.53 |
| 11 | | 1.461 | ASP | 1.000 | | | | |
| 12 | Filter | Plano | | 0.300 | Glass | 1.517 | 64.2 | — |
| 13 | | Plano | | 0.345 | | | | |
| 14 | Image | Plano | | — | | | | |

Note:
Reference wavelength is d-line 587.6 nm.
The effective radius on surface #4 is 1.240 mm.
The effective radius on surface #9 is 1.430 mm.

TABLE 4

Aspheric Coefficients

| Surface # | 2 | 3 | 5 | 6 |
|---|---|---|---|---|
| k = | −9.0135E+00 | 1.4874E+00 | −1.9209E+00 | −9.0000E+01 |
| A4 = | 3.9439E−02 | −2.1196E−02 | 6.1921E−02 | 1.2207E−01 |
| A6 = | −3.5466E−02 | −4.9379E−02 | −3.0870E−01 | −2.1158E−01 |
| A8 = | −5.0579E−03 | 2.4276E−01 | 3.6381E−01 | 9.7946E−02 |
| A10 = | 1.5939E−02 | −9.8459E−03 | −3.0144E−01 | 5.6216E−02 |
| A12 = | −1.0609E−02 | 1.0371E−03 | 1.3683E−01 | −1.1140E−01 |
| A14 = | | | −2.2936E−02 | 5.6085E−02 |
| A16 = | | | | −9.2753E−03 |

| Surface # | 7 | 8 | 10 | 11 |
|---|---|---|---|---|
| k = | −9.9543E−01 | −5.4461E−01 | −1.7408E+00 | −1.5548E+00 |
| A4 = | 5.2059E−01 | 1.6714E−01 | −1.5583E−01 | −1.3597E−01 |
| A6 = | −7.2529E−01 | −3.3943E−01 | 8.7896E−02 | 6.5613E−02 |
| A8 = | 6.4258E−01 | 5.5232E−01 | −3.2296E−02 | −2.6366E−02 |
| A10 = | −3.1645E−01 | −5.5717E−01 | 6.1372E−03 | 6.8237E−03 |
| A12 = | 8.5507E−02 | 3.3665E−01 | −1.0498E−05 | −9.6876E−04 |
| A14 = | −1.0326E−02 | −1.0110E−01 | −1.7895E−04 | 6.2172E−05 |
| A16 = | 1.6439E−04 | 1.1588E−02 | 1.8397E−05 | −1.1876E−06 |

In the 2nd embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 2nd embodiment are as specified below.

| 2nd Embodiment | | | |
|---|---|---|---|
| f [mm] | 3.37 | (R7 + R8)/(R7 − R8) | −13.66 |
| Fno | 1.45 | f/f1 | 0.84 |
| HFOV [deg.] | 35.1 | (|f/f2| + |f/f3|)/(f/f1 + f/f4) | 0.25 |
| CT1/CT4 | 0.93 | f/f34 | 0.64 |
| CT2/T12 | 0.70 | f/f4 | 0.52 |
| CT2/T23 | 0.53 | f1/f4 | 0.62 |
| T12/T23 | 0.75 | f34/f12 | 0.93 |
| (R5 − R6)/(R5 + R6) | −0.08 | f4/|f3| | 0.04 |
| R6/R7 | −0.92 | EPD/CT2 | 8.02 |

3rd Embodiment

Figure 3A:
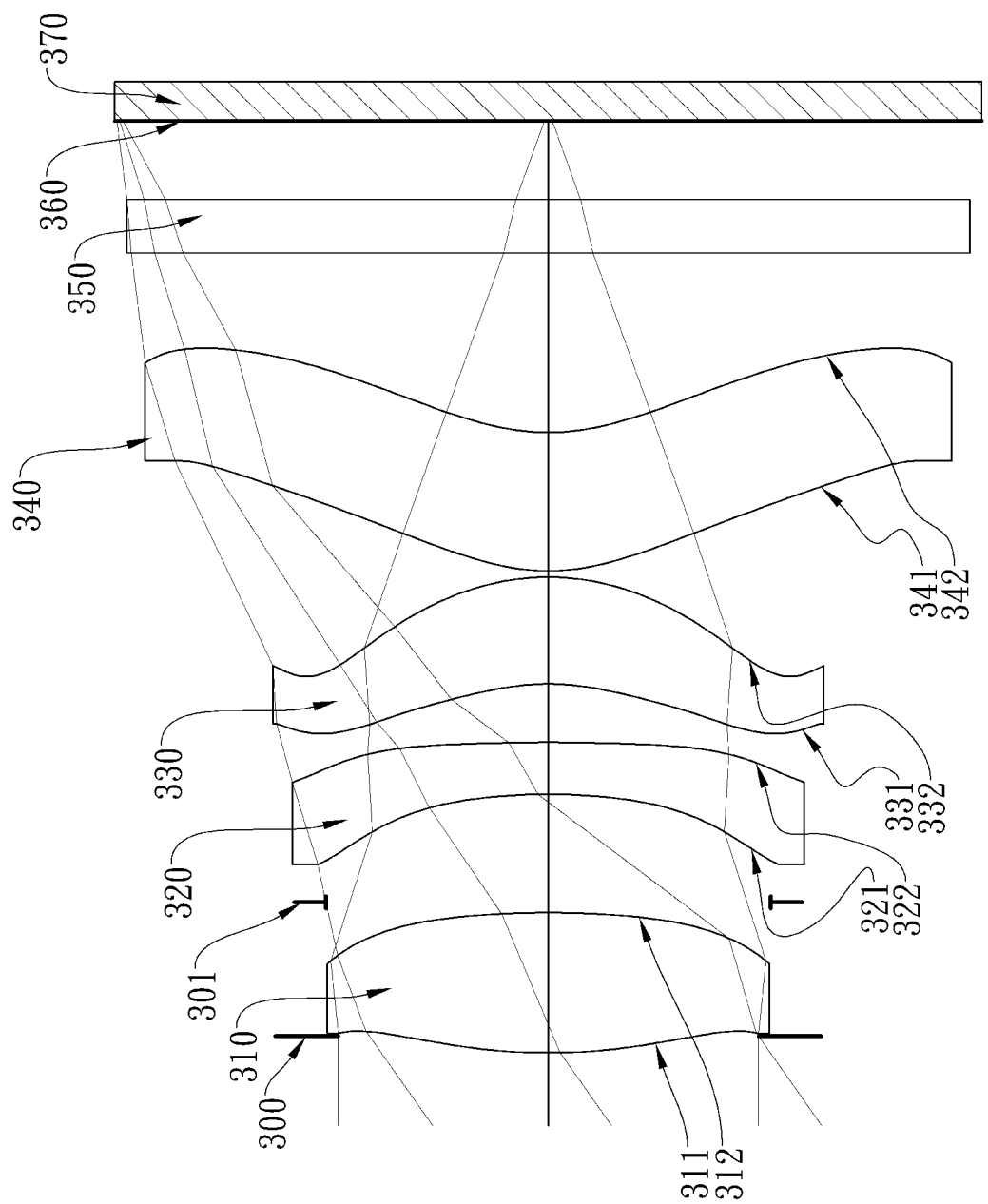
FIG. 3A is a schematic view of an image capturing apparatus according to the 3rd embodiment of the present disclosure.
Figure 3B:
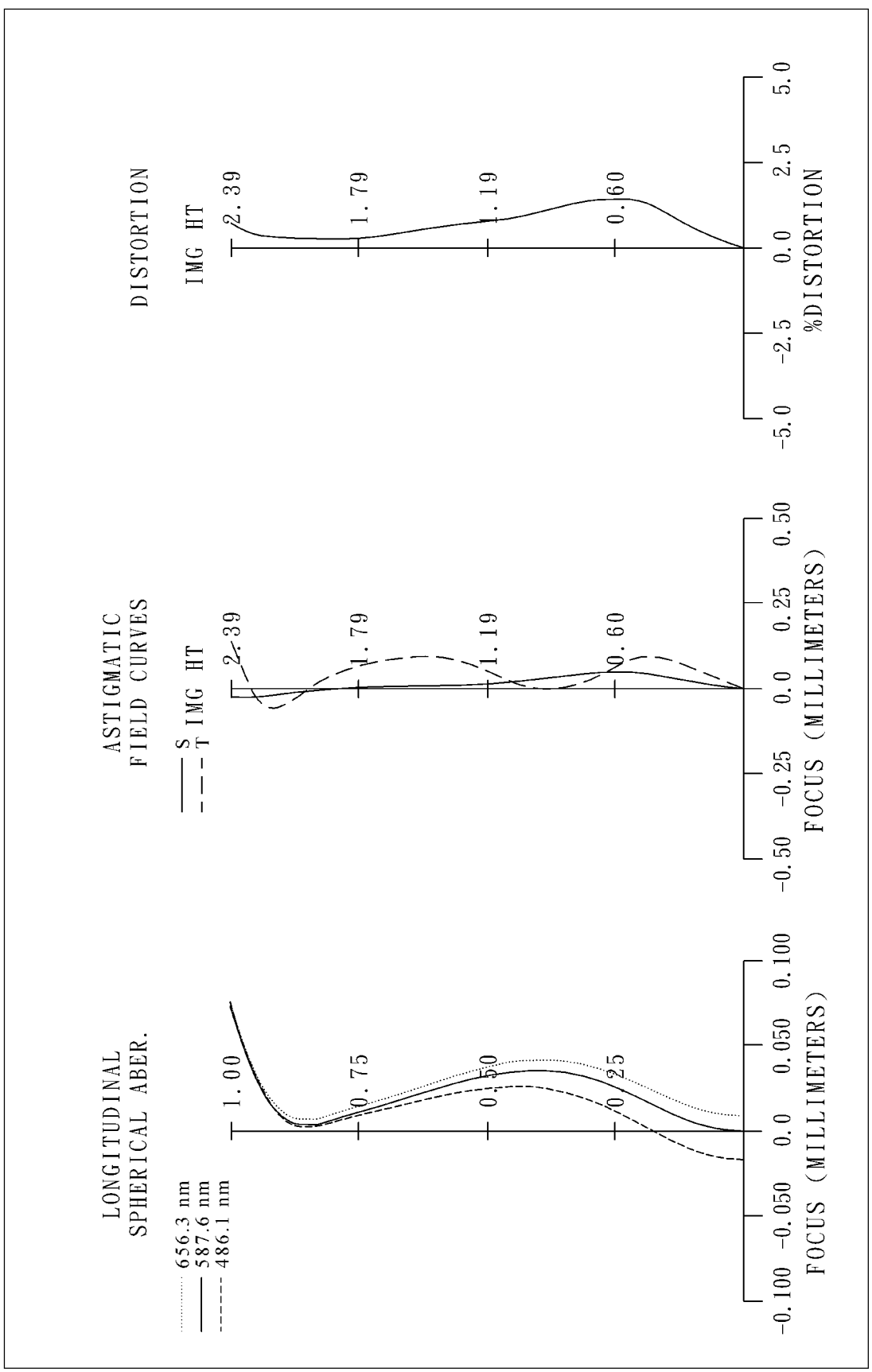
FIG. 3B shows longitudinal spherical aberration curves, astigmatic field curves and a distortion curve of the image capturing apparatus according to the 3rd embodiment.

FIG. 3A is a schematic view of an image capturing apparatus according to the 3rd embodiment of the present disclosure. FIG. 3B shows, in order from left to right, longitudinal spherical aberration curves, astigmatic field curves and a distortion curve of the image capturing apparatus according to the 3rd embodiment.

In FIG. 3A, an image capturing apparatus comprises the optical photographing lens system (not otherwise herein labeled) of the present disclosure and an image sensor 370. The optical photographing lens system comprises, in order from an object side to an image side, an aperture stop 300, a first lens element 310, a stop 301, a second lens element 320, a third lens element 330, a fourth lens element 340, a filter 350 and an image surface 360, wherein the optical photographing lens system comprises four lens elements (310-340) with no additional lens element disposed between the first lens element 310 and the fourth lens element 340.

The first lens element 310 with positive refractive power has an object-side surface 311 being convex in a paraxial region thereof and an image-side surface 312 being convex in a paraxial region thereof, which are both aspheric, and the first lens element 310 is made of glass.

The second lens element 320 with negative refractive power has an object-side surface 321 being concave in a paraxial region thereof and an image-side surface 322 being convex in a paraxial region thereof, which are both aspheric, and the second lens element 320 is made of plastic. Moreover, both the object-side surface 321 and the image-side surface 322 have at least one inflection point, respectively.

The third lens element 330 with positive refractive power has an object-side surface 331 being concave in a paraxial region thereof and an image-side surface 332 being convex in a paraxial region thereof, which are both aspheric, and the third lens element 330 is made of plastic. Moreover, the image-side surface 332 has at least one concave critical point in an off-axial region.

The fourth lens element 340 with positive refractive power has an object-side surface 341 being convex in a paraxial region thereof and an image-side surface 342 being concave in a paraxial region thereof, which are both aspheric, and the fourth lens element 340 is made of plastic. Moreover, the image-side surface 342 has at least one convex critical point in an off-axial region.

The filter 350 is located between the fourth lens element 340 and the image surface 360. The filter 350 is made of glass and does not affect the focal length of the optical photographing lens system. The image sensor 370 is disposed on or near the image surface 360 of the optical photographing lens system.

Also, both a focal length of the first lens element 310 and a focal length of the fourth lens element 340 are shorter than a focal length of the second lens element 320 and a focal length of the third lens element 330.

The detailed optical data of the 3rd embodiment are shown in TABLE 5, and the aspheric surface data of the 3rd embodiment are shown in TABLE 6.

TABLE 5

(3rd Embodiment)
f = 3.35 mm, Fno = 1.43, HFOV = 35.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.093 | | | | |
| 2 | Lens 1 | 3.176 | ASP | 0.782 | Glass | 1.518 | 63.5 | 4.12 |
| 3 | | −5.959 | ASP | 0.059 | | | | |
| 4 | Stop | Plano | | 0.602 | | | | |
| 5 | Lens 2 | −3.528 | ASP | 0.290 | Plastic | 1.660 | 20.4 | −8.38 |
| 6 | | −10.072 | ASP | 0.327 | | | | |
| 7 | Lens 3 | −1.279 | ASP | 0.596 | Plastic | 1.544 | 55.9 | 17.72 |
| 8 | | −1.315 | ASP | 0.035 | | | | |
| 9 | Lens 4 | 1.159 | ASP | 0.773 | Plastic | 1.544 | 55.9 | 7.58 |
| 10 | | 1.234 | ASP | 1.000 | | | | |
| 11 | Filter | Plano | | 0.300 | Glass | 1.517 | 64.2 | — |
| 12 | | Plano | | 0.437 | | | | |
| 13 | Image | Plano | | — | | | | |

Note:
Reference wavelength is d-line 587.6 nm.
The effective radius on surface #4 is 1.240 mm.

TABLE 6

Aspheric Coefficients

| Surface # | 2 | 3 | 5 | 6 |
|---|---|---|---|---|
| k = | −1.2792E+01 | 4.9381E+00 | 5.4835E+00 | −8.4782E+00 |
| A4 = | 3.4463E−02 | −2.5544E−02 | 5.4975E−03 | 8.5254E−02 |
| A6 = | −4.3445E−02 | −3.7956E−02 | −2.2711E−01 | −2.0396E−01 |
| A8 = | −5.4711E−03 | 2.0276E−02 | 3.5699E−01 | 1.1267E−01 |
| A10 = | 1.6594E−02 | −9.4654E−03 | −3.0168E−01 | 5.6054E−02 |
| A12 = | −1.0628E−02 | 1.0425E−03 | 1.3683E−01 | −1.1310E−01 |
| A14 = | 2.1684E−06 | 3.8306E−07 | −2.2916E−02 | 5.6141E−02 |
| A16 = | | | | −9.2784E−03 |

| Surface # | 7 | 8 | 9 | 10 |
|---|---|---|---|---|
| k = | −8.1256E−01 | −4.2846E−01 | −1.9140E+00 | −1.7069E+00 |
| A4 = | 5.0552E−01 | 1.0973E−01 | −1.6131E−01 | −1.4957E−01 |
| A6 = | −7.3819E−01 | −2.9879E−01 | 9.5357E−02 | 7.5757E−02 |
| A8 = | 6.4530E−01 | 5.4602E−01 | −3.3332E−02 | −2.8062E−02 |
| A10 = | −3.1055E−01 | −5.6300E−01 | 5.6737E−03 | 6.5737E−03 |
| A12 = | 8.4132E−02 | 3.3693E−01 | 4.5887E−05 | −8.5692E−04 |
| A14 = | −1.0581E−02 | −1.0064E−01 | −1.5183E−04 | 4.9630E−05 |
| A16 = | 1.6668E−04 | 1.1584E−02 | 1.4215E−05 | −6.7366E−07 |

In the 3rd embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 3rd embodiment are as specified below.

|  | 3rd Embodiment | | |
|---|---|---|---|
| f [mm] | 3.35 | (R7 + R8)/(R7 − R8) | −32.12 |
| Fno | 1.43 | f/f1 | 0.81 |
| HFOV [deg.] | 35.2 | (\|f/f2\| + \|f/f3\|)/(f/f1 + f/f4) | 0.47 |
| CT1/CT4 | 1.01 | f/f34 | 0.75 |
| CT2/T12 | 0.44 | f/f4 | 0.44 |
| CT2/T23 | 0.89 | f1/f4 | 0.54 |
| T12/T23 | 2.02 | f34/f12 | 0.67 |
| (R5 − R6)/(R5 + R6) | −0.01 | f4/\|f3\| | 0.43 |
| R6/R7 | −1.13 | EPD/CT2 | 8.09 |

4th Embodiment

Figure 4A:
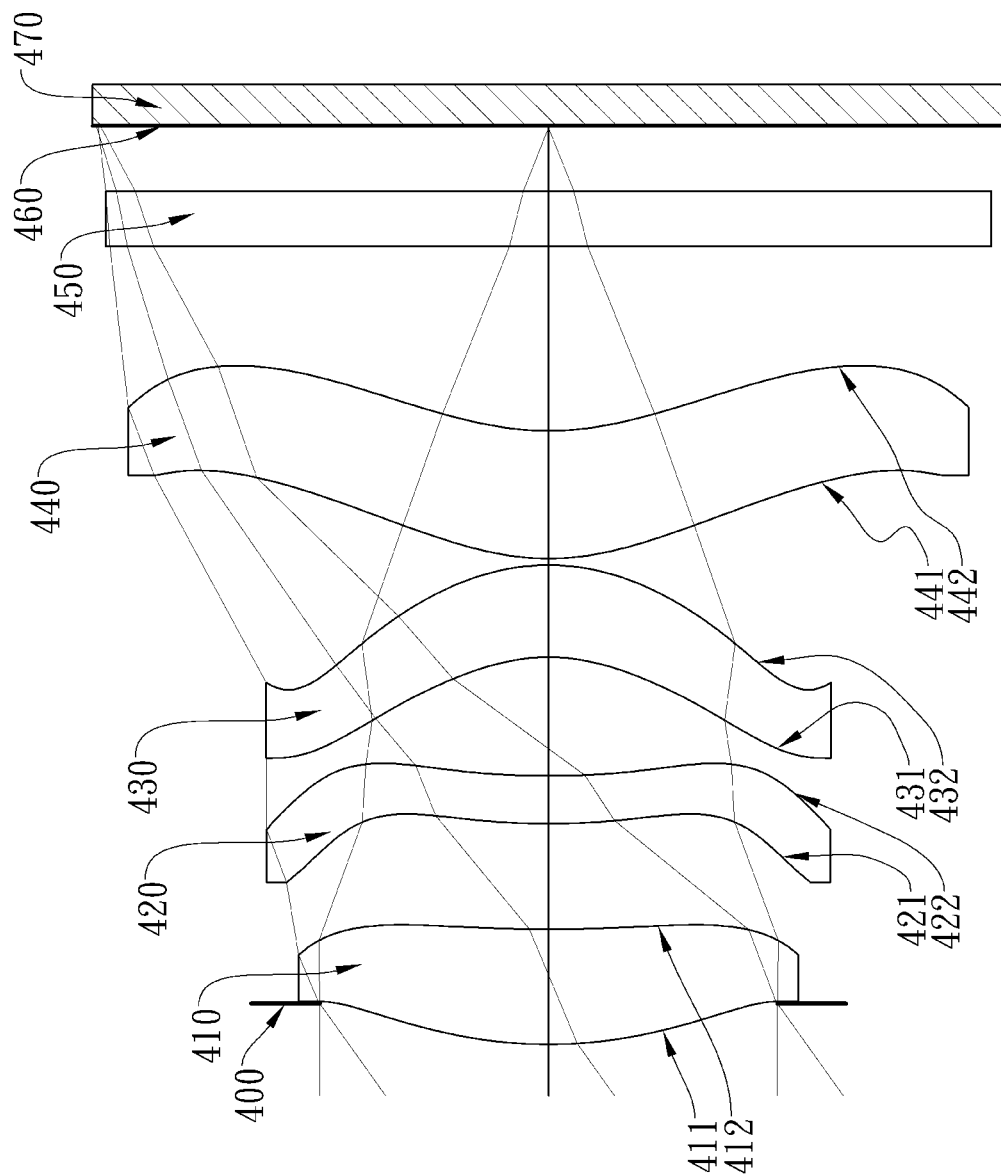
FIG. 4A is a schematic view of an image capturing apparatus according to the 4th embodiment of the present disclosure.
Figure 4B:
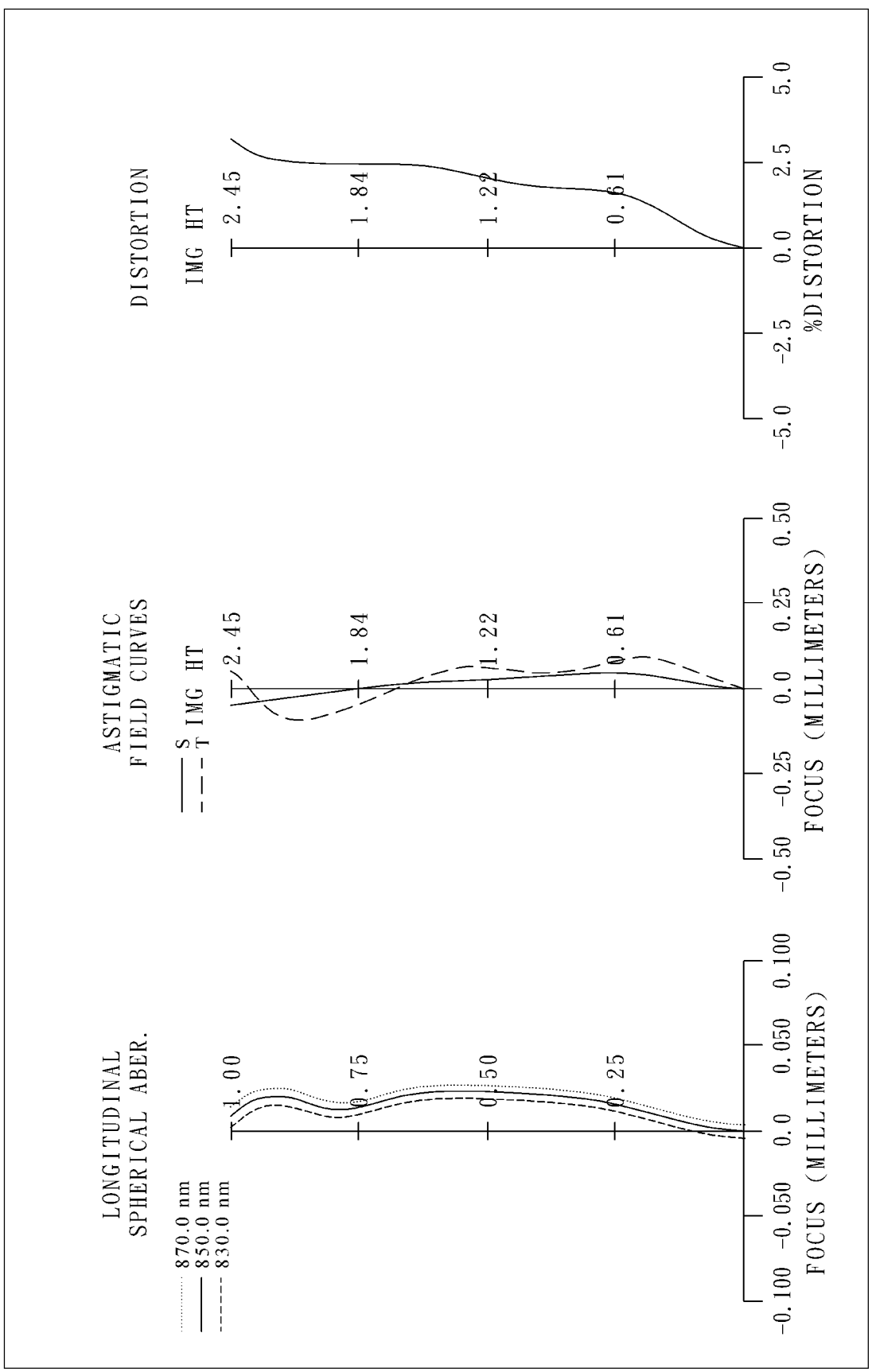
FIG. 4B shows longitudinal spherical aberration curves, astigmatic field curves and a distortion curve of the image capturing apparatus according to the 4th embodiment.

FIG. 4A is a schematic view of an image capturing apparatus according to the 4th embodiment of the present disclosure. FIG. 4B shows, in order from left to right, longitudinal spherical aberration curves, astigmatic field curves and a distortion curve of the image capturing apparatus according to the 4th embodiment.

In FIG. 4A, an image capturing apparatus comprises an optical photographing lens system (not otherwise herein labeled) of the present disclosure and an image sensor 470. The optical photographing lens system comprises, in order from an object side to an image side, an aperture stop 400, a first lens element 410, a second lens element 420, a third lens element 430, a fourth lens element 440, a filter 450 and an image surface 460, wherein the optical photographing lens system comprises four lens elements (410-440) with no additional lens element disposed between the first lens element 410 and the fourth lens element 440.

The first lens element 410 with positive refractive power has an object-side surface 411 being convex in a paraxial region thereof and an image-side surface 412 being concave in a paraxial region thereof, which are both aspheric, and the first lens element 410 is made of plastic.

The second lens element 420 with positive refractive power has an object-side surface 421 being convex in a paraxial region thereof and an image-side surface 422 being concave in a paraxial region thereof, which are both aspheric, and the second lens element 420 is made of plastic. Moreover, both the object-side surface 421 and the image-side surface 422 have at least one inflection point, respectively.

The third lens element 430 with positive refractive power has an object-side surface 431 being concave in a paraxial region thereof and an image-side surface 432 being convex in a paraxial region thereof, which are both aspheric, and the third lens element 430 is made of plastic. Moreover, the image-side surface 432 has at least one concave critical point in an off-axial region.

The fourth lens element 440 with positive refractive power has an object-side surface 441 being convex in a paraxial region thereof and an image-side surface 442 being concave in a paraxial region thereof, which are both aspheric, and the fourth lens element 440 is made of plastic. Moreover, the image-side surface 442 has at least one convex critical point in an off-axial region.

The filter 450 is located between the fourth lens element 440 and the image surface 460. The filter 450 is made of glass and does not affect the focal length of the optical photographing lens system. The image sensor 470 is disposed on or near the image surface 460 of the optical photographing lens system.

Also, both a focal length of the first lens element 410 and a focal length of the fourth lens element 440 are shorter than a focal length of the second lens element 420 and a focal length of the third lens element 430.

The detailed optical data of the 4th embodiment are shown in TABLE 7, and the aspheric surface data of the 4th embodiment are shown in TABLE 8.

TABLE 7

(4th Embodiment)
f = 3.30 mm, Fno = 1.33, HFOV = 35.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.221 | | | | |
| 2 | Lens 1 | 2.462 | ASP | 0.624 | Plastic | 1.619 | 23.5 | 5.72 |
| 3 | | 7.283 | ASP | 0.573 | | | | |
| 4 | Lens 2 | 4.027 | ASP | 0.260 | Plastic | 1.536 | 55.9 | 29.56 |
| 5 | | 5.278 | ASP | 0.644 | | | | |
| 6 | Lens 3 | −0.986 | ASP | 0.499 | Plastic | 1.619 | 23.5 | 112.96 |
| 7 | | −1.160 | ASP | 0.035 | | | | |
| 8 | Lens 4 | 1.332 | ASP | 0.693 | Plastic | 1.619 | 23.5 | 7.03 |
| 9 | | 1.538 | ASP | 1.000 | | | | |
| 10 | Filter | Plano | | 0.300 | Glass | 1.510 | 64.2 | — |
| 11 | | Plano | | 0.354 | | | | |
| 12 | Image | Plano | | — | | | | |

Note:
Reference wavelength is 850.0 nm.

TABLE 8

Aspheric Coefficients

| Surface # | | | | |
|---|---|---|---|---|
| | 2 | 3 | 4 | 5 |
| k = | −1.4572E+01 | 4.9986E+00 | 5.1165E+00 | −8.5195E+01 |
| A4 = | 9.9567E−02 | −4.2857E−02 | 6.4672E−02 | 2.0985E−01 |
| A6 = | −8.3200E−02 | −3.9066E−03 | −3.8797E−01 | −4.1750E−01 |
| A8 = | 3.0375E−02 | −1.6391E−02 | 4.1651E−01 | 3.3986E−01 |
| A10 = | −1.8370E−03 | 7.0020E−03 | −3.5606E−01 | −1.6065E−01 |
| A12 = | −4.2558E−03 | −1.6961E−03 | 1.6384E−01 | 1.8274E−02 |
| A14 = | | | −2.7783E−02 | 1.2137E−02 |
| A16 = | | | | −3.1050E−03 |

| Surface # | | | | |
|---|---|---|---|---|
| | 6 | 7 | 8 | 9 |
| k = | −8.3340E−01 | −5.5680E−01 | −4.0299E+00 | −5.8804E−01 |
| A4 = | 3.5827E−01 | 9.0846E−01 | −4.3345E−02 | −1.7480E−01 |
| A6 = | −4.2228E−01 | −1.4198E−01 | 3.4246E−02 | 9.3650E−02 |
| A8 = | 3.3834E−01 | 2.7249E−01 | −2.3955E−02 | −5.1721E−02 |
| A10 = | −1.3960E−01 | −3.0204E−01 | 9.1354E−03 | 1.8143E−02 |
| A12 = | 2.7994E−02 | 1.8522E−01 | −1.8252E−03 | −3.8451E−03 |
| A14 = | −7.8697E−04 | −5.3587E−02 | 1.6679E−04 | 4.4450E−04 |
| A16 = | −4.5080E−04 | 5.8363E−03 | −4.4947E−06 | −2.1968E−05 |

In the 4th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 4th embodiment are as specified below.

| 4th Embodiment | | | |
|---|---|---|---|
| f [mm] | 3.30 | (R7 + R8)/(R7 − R8) | −13.94 |
| Fno | 1.33 | f/f1 | 0.58 |
| HFOV [deg.] | 35.6 | (|f/f2| + |f/f3|)/(f/f1 + f/f4) | 0.13 |
| CT1/CT4 | 0.90 | f/f34 | 0.59 |
| CT2/T12 | 0.45 | f/f4 | 0.47 |
| CT2/T23 | 0.40 | f1/f4 | 0.81 |
| T12/T23 | 0.89 | f34/f12 | 1.14 |
| (R5 − R6)/(R5 + R6) | −0.08 | f4/|f3| | 0.06 |
| R6/R7 | −0.87 | EPD/CT2 | 9.54 |

5th Embodiment

Figure 5A:
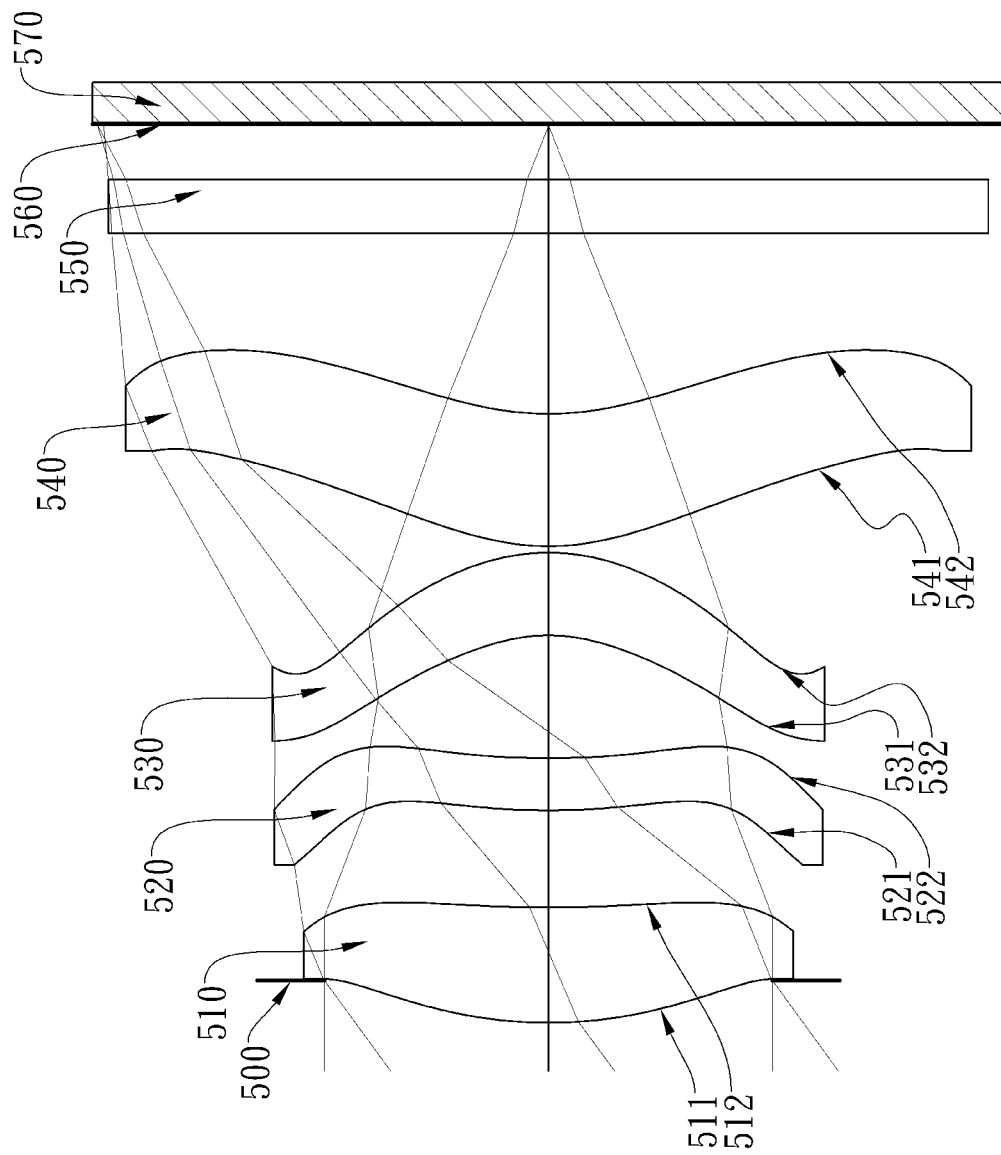
FIG. 5A is a schematic view of an image capturing apparatus according to the 5th embodiment of the present disclosure.
Figure 5B:
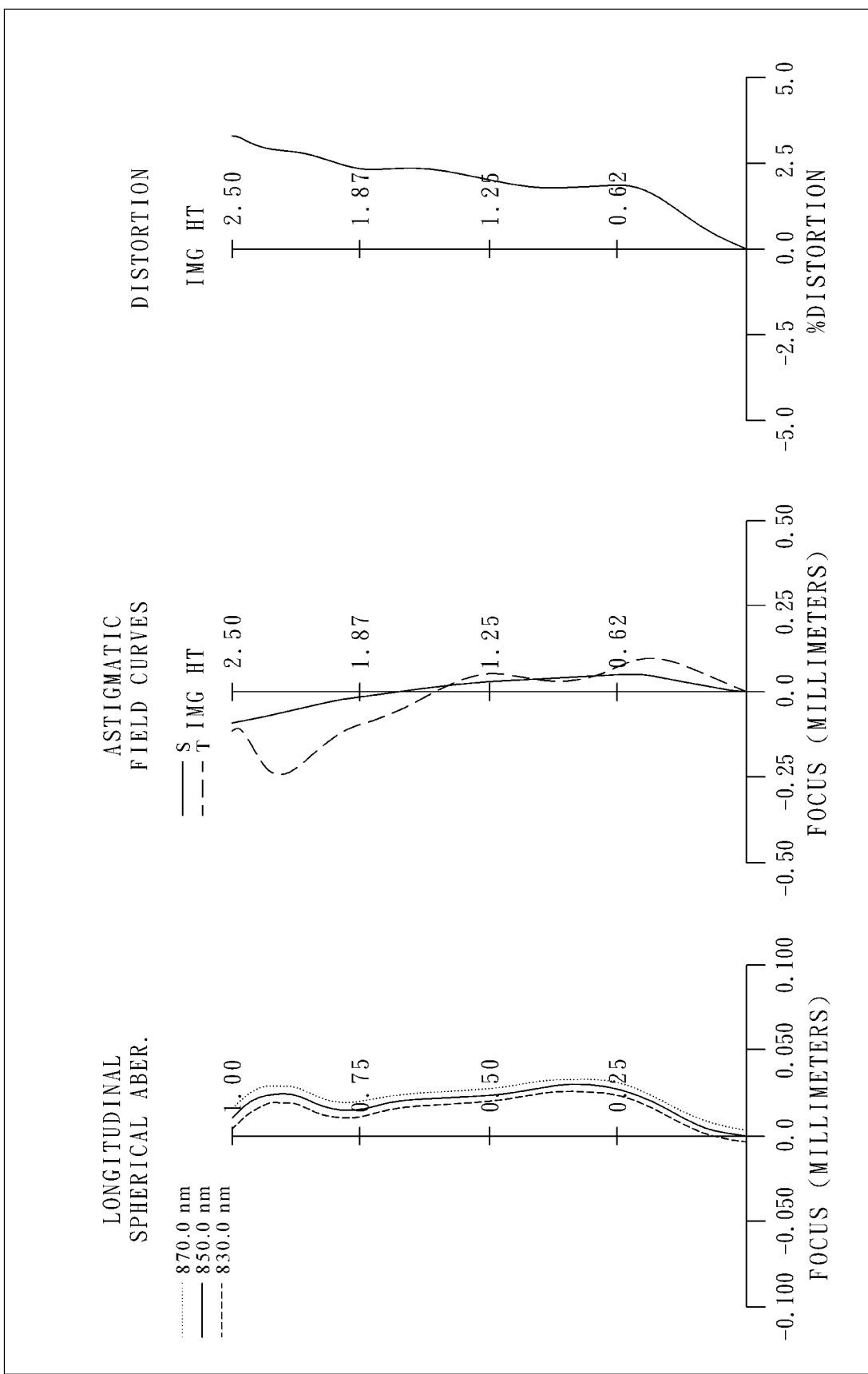
FIG. 5B shows longitudinal spherical aberration curves, astigmatic field curves and a distortion curve of the image capturing apparatus according to the 5th embodiment.

FIG. 5A is a schematic view of an image capturing apparatus according to the 5th embodiment of the present disclosure. FIG. 5B shows, in order from left to right, longitudinal spherical aberration curves, astigmatic field curves and a distortion curve of the image capturing apparatus according to the 5th embodiment.

In FIG. 5A, an image capturing apparatus comprises an optical photographing lens system (not otherwise herein labeled) of the present disclosure and an image sensor 570. The optical photographing lens system comprises, in order from an object side to an image side, an aperture stop 500, a first lens element 510, a second lens element 520, a third lens element 530, a fourth lens element 540, a filter 550 and an image surface 560, wherein the optical photographing lens system comprises four lens elements (510-540) with no additional lens element disposed between the first lens element 510 and the fourth lens element 540.

The first lens element 510 with positive refractive power has an object-side surface 511 being convex in a paraxial region thereof and an image-side surface 512 being concave in a paraxial region thereof, which are both aspheric, and the first lens element 510 is made of plastic.

The second lens element 520 with positive refractive power has an object-side surface 521 being convex in a paraxial region thereof and an image-side surface 522 being concave in a paraxial region thereof, which are both aspheric, and the second lens element 520 is made of plastic. Moreover, both the object-side surface 521 and the image-side surface 522 have at least one inflection point, respectively.

The third lens element 530 with negative refractive power has an object-side surface 531 being concave in a paraxial region thereof and an image-side surface 532 being convex in a paraxial region thereof, which are both aspheric, and the third lens element 530 is made of plastic. Moreover, the image-side surface 532 has at least one concave critical point in an off-axial region.

The fourth lens element 540 with positive refractive power has an object-side surface 541 being convex in a paraxial region thereof and an image-side surface 542 being concave in a paraxial region thereof, which are both aspheric, and the fourth lens element 540 is made of plastic. Moreover, the image-side surface 542 has at least one convex critical point in an off-axial region.

The filter 550 is located between the fourth lens element 540 and the image surface 560. The filter 550 is made of glass and does not affect the focal length of the optical photographing lens system. The image sensor 570 is disposed on or near the image surface 560 of the optical photographing lens system.

Also, both a focal length of the first lens element 510 and a focal length of the fourth lens element 540 are shorter than a focal length of the second lens element 520 and a focal length of the third lens element 530.

The detailed optical data of the 5th embodiment are shown in TABLE 9, and the aspheric surface data of the 5th embodiment are shown in TABLE 10.

TABLE 9

(5th Embodiment)
f = 3.30 mm, Fno = 1.33, HFOV = 36.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.233 | | | | |
| 2 | Lens 1 | 2.412 | ASP | 0.639 | Plastic | 1.619 | 23.5 | 5.76 |
| 3 | | 6.710 | ASP | 0.539 | | | | |
| 4 | Lens 2 | 4.338 | ASP | 0.290 | Plastic | 1.536 | 55.9 | 31.02 |
| 5 | | 5.732 | ASP | 0.681 | | | | |
| 6 | Lens 3 | −0.929 | ASP | 0.459 | Plastic | 1.619 | 23.5 | −328.23 |
| 7 | | −1.109 | ASP | 0.035 | | | | |
| 8 | Lens 4 | 1.322 | ASP | 0.734 | Plastic | 1.619 | 23.5 | 6.44 |
| 9 | | 1.559 | ASP | 1.000 | | | | |
| 10 | Filter | Plano | | 0.300 | Glass | 1.510 | 64.2 | — |
| 11 | | Plano | | 0.306 | | | | |
| 12 | Image | Plano | | — | | | | |

Note:
Reference wavelength is 850.0 nm.

TABLE 10

Aspheric Coefficients

| | Surface # | | | |
|---|---|---|---|---|
| | 2 | 3 | 4 | 5 |
| k = | −1.6997E+01 | 4.8746E+00 | 6.0000E+00 | −9.0000E+01 |
| A4 = | 1.1624E−01 | −4.1969E−02 | 8.7397E−02 | 2.0985E−01 |
| A6 = | −9.0874E−02 | −1.9602E−03 | −4.2575E−01 | −4.1750E−01 |
| A8 = | 2.5900E−02 | −2.4105E−02 | 4.5594E−01 | 3.3986E−01 |
| A10 = | 4.5859E−03 | 1.2556E−02 | −3.7270E−01 | −1.6065E−01 |
| A12 = | −6.0325E−03 | −2.9588E−03 | 1.6576E−01 | 1.8274E−02 |
| A14 = | | | −2.7609E−02 | 1.2137E−02 |
| A16 = | | | | −3.1050E−03 |

| | Surface # | | | |
|---|---|---|---|---|
| | 6 | 7 | 8 | 9 |
| k = | −9.3842E−01 | −5.9125E−01 | −4.2599E+00 | −5.9633E−01 |
| A4 = | 4.2366E−01 | 1.5695E−01 | −1.5673E−02 | −1.6867E−01 |
| A6 = | −5.4018E−01 | −2.6200E−01 | −1.5778E−02 | 8.0447E−02 |
| A8 = | 4.2326E−01 | 4.0996E−01 | 1.8289E−02 | −3.9494E−02 |
| A10 = | −1.7634E−01 | −4.0827E−01 | −9.6557E−03 | 1.2761E−02 |
| A12 = | 3.8356E−02 | 2.3902E−01 | 2.7672E−03 | −2.5510E−03 |
| A14 = | −2.6452E−03 | −6.8639E−02 | −4.0577E−04 | 2.8521E−04 |
| A16 = | −2.9845E−04 | 7.5408E−03 | 2.3531E−05 | −1.4025E−05 |

In the 5th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 5th embodiment are as specified below.

| 5th Embodiment | | | |
|---|---|---|---|
| f [mm] | 3.30 | (R7 + R8)/(R7 − R8) | −12.17 |
| Fno | 1.33 | f/f1 | 0.57 |
| HFOV [deg.] | 36.1 | (\|f/f2\| + \|f/f3\|)/(f/f1 + f/f4) | 0.11 |
| CT1/CT4 | 0.87 | f/f34 | 0.60 |
| CT2/T12 | 0.54 | f/f4 | 0.51 |
| CT2/T23 | 0.43 | f1/f4 | 0.89 |
| T12/T23 | 0.79 | f34/f12 | 1.12 |
| (R5 − R6)/(R5 + R6) | −0.09 | f4/\|f3\| | 0.02 |
| R6/R7 | −0.84 | EPD/CT2 | 8.56 |

6th Embodiment

Figure 6A:
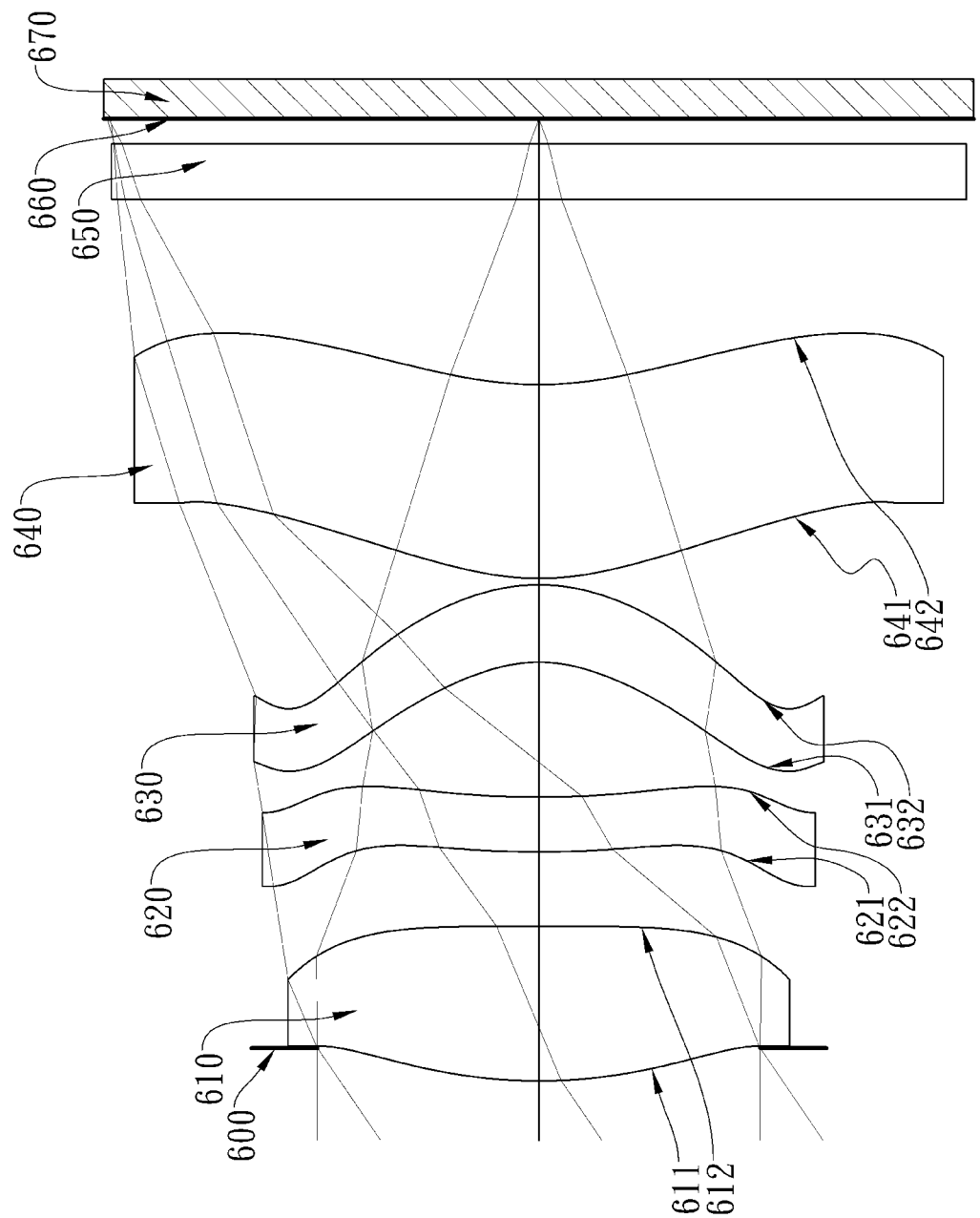
FIG. 6A is a schematic view of an image capturing apparatus according to the 6th embodiment of the present disclosure.
Figure 6B:
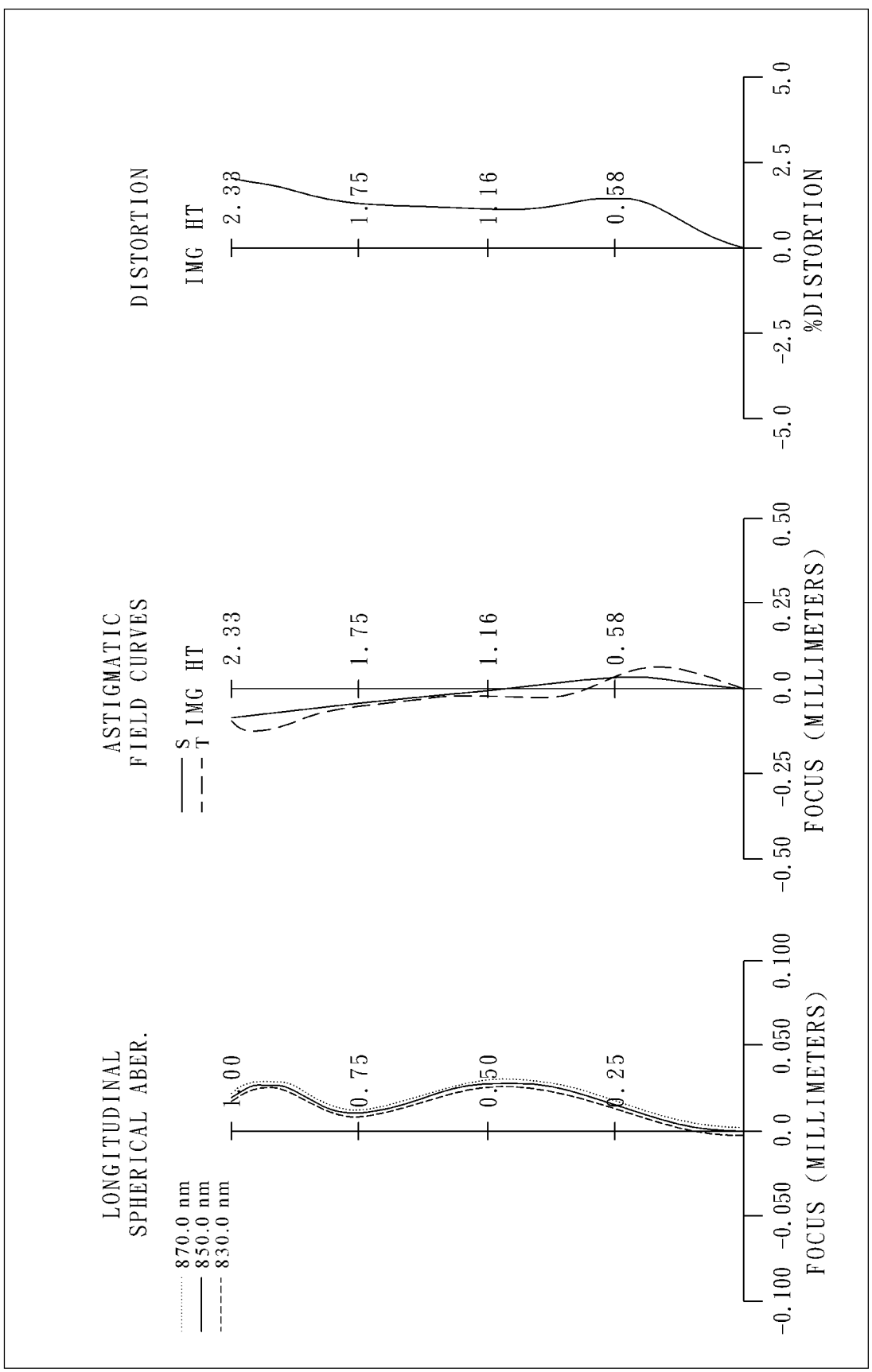
FIG. 6B shows longitudinal spherical aberration curves, astigmatic field curves and a distortion curve of the image capturing apparatus according to the 6th embodiment.

FIG. 6A is a schematic view of an image capturing apparatus according to the 6th embodiment of the present disclosure. FIG. 6B shows, in order from left to right, longitudinal spherical aberration curves, astigmatic field curves and a distortion curve of the image capturing apparatus according to the 6th embodiment.

In FIG. 6A, an image capturing apparatus comprises an optical photographing lens system (not otherwise herein labeled) of the present disclosure and an image sensor 670. The optical photographing lens system comprises, in order from an object side to an image side, an aperture stop 600, a first lens element 610, a second lens element 620, a third lens element 630, a fourth lens element 640, a filter 650 and an image surface 660, wherein the optical photographing lens system comprises four lens elements (610-640) with no additional lens element disposed between the first lens element 610 and the fourth lens element 640.

The first lens element 610 with positive refractive power has an object-side surface 611 being convex in a paraxial region thereof and an image-side surface 612 being plane in a paraxial region thereof, which are both aspheric, and the first lens element 610 is made of plastic.

The second lens element 620 with positive refractive power has an object-side surface 621 being convex in a paraxial region thereof and an image-side surface 622 being concave in a paraxial region thereof, which are both aspheric, and the second lens element 620 is made of plastic. Moreover, both the object-side surface 621 and the image-side surface 622 have at least one inflection point, respectively.

The third lens element 630 with negative refractive power has an object-side surface 631 being concave in a paraxial region thereof and an image-side surface 632 being convex in a paraxial region thereof, which are both aspheric, and the third lens element 630 is made of plastic. Moreover, the image-side surface 632 has at least one concave critical point in an off-axial region.

The fourth lens element 640 with positive refractive power has an object-side surface 641 being convex in a paraxial region thereof and an image-side surface 642 being concave in a paraxial region thereof, which are both aspheric, and the fourth lens element 640 is made of plastic. Moreover, the image-side surface 642 has at least one convex critical point in an off-axial region.

The filter 650 is located between the fourth lens element 640 and the image surface 660. The filter 650 is made of glass and does not affect the focal length of the optical photographing lens system. The image sensor 670 is disposed on or near the image surface 660 of the optical photographing lens system.

Also, both a focal length of the first lens element 610 and a focal length of the fourth lens element 640 are shorter than a focal length of the second lens element 620 and a focal length of the third lens element 630.

The detailed optical data of the 6th embodiment are shown in TABLE 11, and the aspheric surface data of the 6th embodiment are shown in TABLE 12.

TABLE 11

(6th Embodiment)
f = 3.34 mm, Fno = 1.40, HFOV = 34.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.178 | | | | |
| 2 | Lens 1 | 2.670 | ASP | 0.834 | Plastic | 1.526 | 55.9 | 5.07 |
| 3 | | ∞ | ASP | 0.402 | | | | |
| 4 | Lens 2 | 5.321 | ASP | 0.297 | Plastic | 1.637 | 20.4 | 85.90 |
| 5 | | 5.766 | ASP | 0.728 | | | | |
| 6 | Lens 3 | −0.797 | ASP | 0.418 | Plastic | 1.619 | 23.5 | −23.82 |
| 7 | | −1.012 | ASP | 0.035 | | | | |
| 8 | Lens 4 | 1.504 | ASP | 1.046 | Plastic | 1.619 | 23.5 | 5.80 |
| 9 | | 1.901 | ASP | 1.000 | | | | |
| 10 | Filter | Plano | | 0.300 | Glass | 1.510 | 64.2 | — |
| 11 | | Plano | | 0.134 | | | | |
| 12 | Image | Plano | | — | | | | |

Note:
Reference wavelength is 850.0 nm.

TABLE 12

Aspheric Coefficients

| | Surface # | | | |
|---|---|---|---|---|
| | 2 | 3 | 4 | 5 |
| k = | −1.1503E+01 | 0.0000E+00 | −8.3773E+00 | −7.7683E+01 |
| A4 = | 5.2070E−02 | −3.4639E−02 | 5.5213E−02 | 1.2318E−01 |
| A6 = | −2.9972E−02 | −5.6776E−02 | −3.1358E−01 | −2.1894E−01 |
| A8 = | −1.4530E−02 | 3.2374E−02 | 3.5994E−01 | 9.4718E−02 |
| A10 = | 1.6956E−02 | −1.1019E−02 | −3.0150E−01 | 5.7152E−02 |
| A12 = | −7.6190E−03 | 1.0874E−03 | 1.3672E−01 | −1.1036E−01 |
| A14 = | | | −2.2852E−02 | 5.6043E−02 |
| A16 = | | | | −9.2765E−03 |

| | Surface # | | | |
|---|---|---|---|---|
| | 6 | 7 | 8 | 9 |
| k = | −9.5384E−01 | −6.4748E−01 | −2.2368E+00 | −6.8599E−01 |
| A4 = | 5.0771E−01 | 1.9571E−01 | −1.2904E−01 | −1.3502E−01 |
| A6 = | −7.1868E−01 | −3.4654E−01 | 8.1532E−02 | 6.3085E−02 |
| A8 = | 6.4641E−01 | 5.5198E−01 | −3.2349E−02 | −2.6308E−02 |
| A10 = | −3.1373E−01 | −5.5603E−01 | 6.2364E−03 | 6.8733E−03 |
| A12 = | 8.5488E−02 | 3.3585E−01 | −9.2127E−06 | −1.0197E−03 |
| A14 = | −1.0742E−02 | −1.0079E−01 | −1.9075E−04 | 7.0649E−05 |
| A16 = | 1.6268E−04 | 1.1587E−02 | 2.0450E−05 | −1.3392E−06 |

In the 6th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 6th embodiment are as specified below.

| 6th Embodiment | | | |
|---|---|---|---|
| f [mm] | 3.34 | (R7 + R8)/(R7 − R8) | −8.58 |
| Fno | 1.40 | f/f1 | 0.66 |
| HFOV [deg.] | 34.2 | (|f/f2| + |f/f3|)/(f/f1 + f/f4) | 0.14 |
| CT1/CT4 | 0.80 | f/f34 | 0.52 |
| CT2/T12 | 0.74 | f/f4 | 0.58 |
| CT2/T23 | 0.41 | f1/f4 | 0.87 |
| T12/T23 | 0.55 | f34/f12 | 1.34 |
| (R5 − R6)/(R5 + R6) | −0.12 | f4/|f3| | 0.24 |
| R6/R7 | −0.67 | EPD/CT2 | 8.04 |

7th Embodiment

Figure 7A:
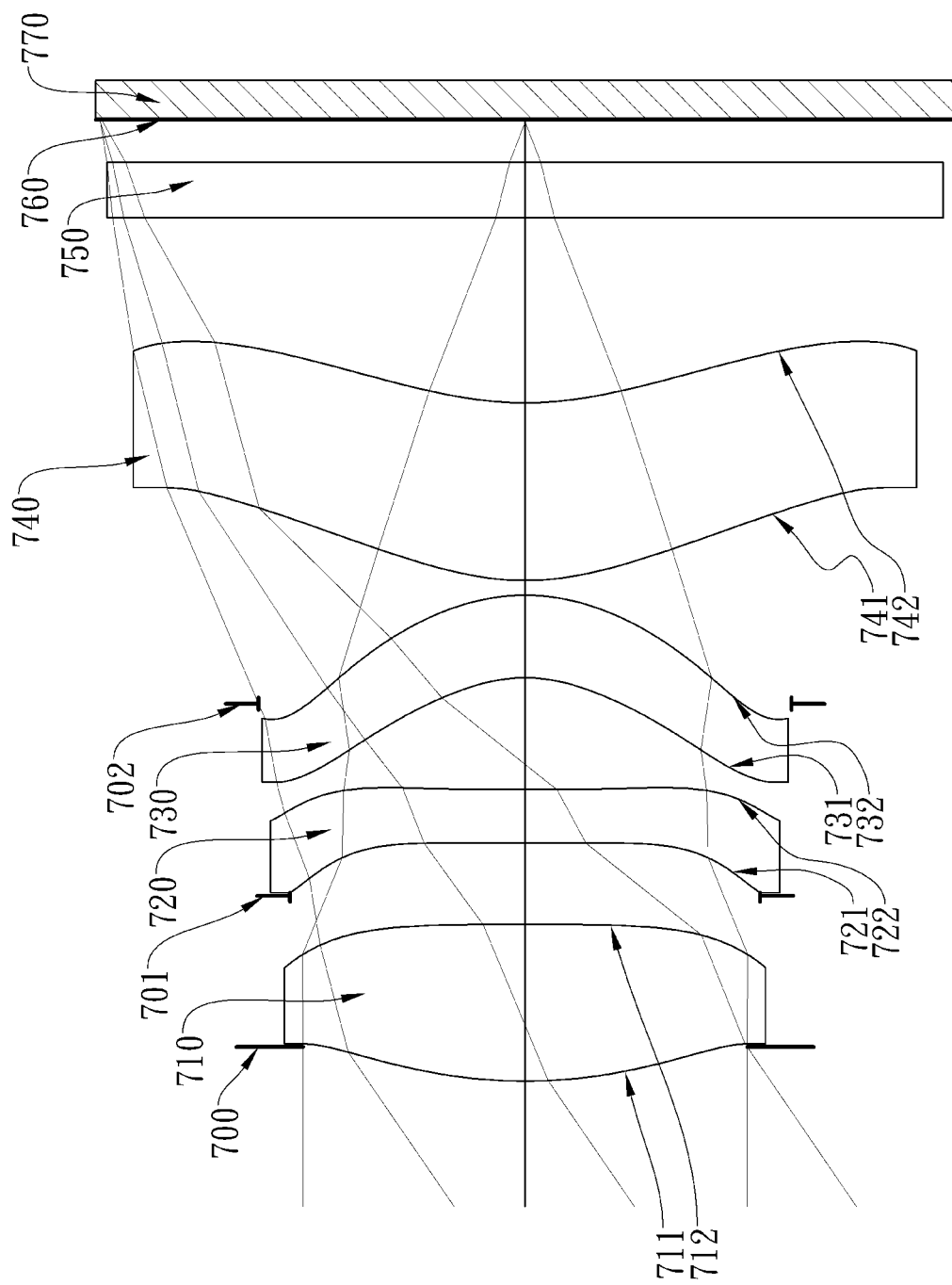
FIG. 7A is a schematic view of an image capturing apparatus according to the 7th embodiment of the present disclosure.
Figure 7B:
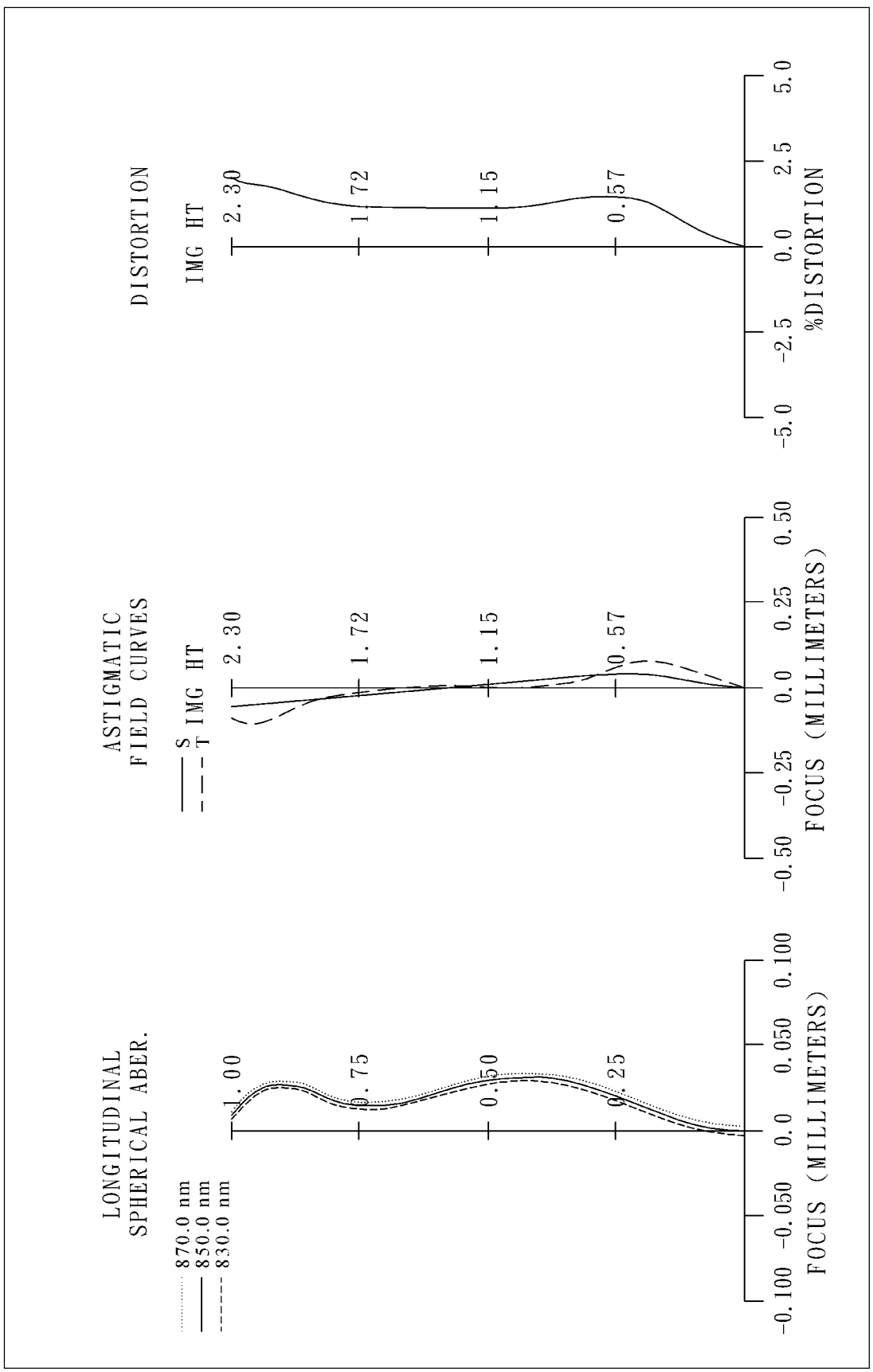
FIG. 7B shows longitudinal spherical aberration curves, astigmatic field curves and a distortion curve of the image capturing apparatus according to the 7th embodiment.

FIG. 7A is a schematic view of an image capturing apparatus according to the 7th embodiment of the present disclosure. FIG. 7B shows, in order from left to right, longitudinal spherical aberration curves, astigmatic field curves and a distortion curve of the image capturing apparatus according to the 7th embodiment.

In FIG. 7A, an image capturing apparatus comprises an optical photographing lens system (not otherwise herein labeled) of the present disclosure and an image sensor 770. The optical photographing lens system comprises, in order from an object side to an image side, an aperture stop 700, a first lens element 710, a stop 701, a second lens element 720, a third lens element 730, a stop 702, a fourth lens element 740, a filter 750 and an image surface 760, wherein the optical photographing lens system comprises four lens elements (710-740) with no additional lens element disposed between the first lens element 710 and the fourth lens element 740.

The first lens element 710 with positive refractive power has an object-side surface 711 being convex in a paraxial region thereof and an image-side surface 712 being convex in a paraxial region thereof, which are both aspheric, and the first lens element 710 is made of plastic.

The second lens element 720 with negative refractive power has an object-side surface 721 being plane in a paraxial region thereof and an image-side surface 722 being concave in a paraxial region thereof, which are both aspheric, and the second lens element 720 is made of plastic. Moreover, both the object-side surface 721 and the image-side surface 722 have at least one inflection point, respectively.

The third lens element 730 with negative refractive power has an object-side surface 731 being concave in a paraxial region thereof and an image-side surface 732 being convex in a paraxial region thereof, which are both aspheric, and the third lens element 730 is made of plastic. Moreover, the image-side surface 732 has at least one concave critical point in an off-axial region.

The fourth lens element 740 with positive refractive power has an object-side surface 741 being convex in a paraxial region thereof and an image-side surface 742 being concave in a paraxial region thereof, which are both aspheric, and the fourth lens element 740 is made of plastic. Moreover, the image-side surface 742 has at least one convex critical point in an off-axial region.

The filter 750 is located between the fourth lens element 740 and the image surface 760. The filter 750 is made of glass and does not affect the focal length of the optical photographing lens system. The image sensor 770 is disposed on or near the image surface 760 of the optical photographing lens system.

Also, both a focal length of the first lens element 710 and a focal length of the fourth lens element 740 are shorter than a focal length of the second lens element 720 and a focal length of the third lens element 730.

The detailed optical data of the 7th embodiment are shown in TABLE 13, and the aspheric surface data of the 7th embodiment are shown in TABLE 14.

TABLE 13

(7th Embodiment)
f = 3.28 mm, Fno = 1.37, HFOV = 34.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.186 | | | | |
| 2 | Lens 1 | 2.695 | ASP | 0.848 | Plastic | 1.536 | 55.9 | 4.70 |
| 3 | | −34.563 | ASP | 0.154 | | | | |
| 4 | Stop | Plano | | 0.285 | | | | |
| 5 | Lens 2 | ∞ | ASP | 0.290 | Plastic | 1.647 | 19.5 | −253.01 |
| 6 | | 163.655 | ASP | 0.605 | | | | |
| 7 | Lens 3 | −0.813 | ASP | 0.447 | Plastic | 1.597 | 26.0 | −19.55 |
| 8 | | −1.054 | ASP | −0.587 | | | | |
| 9 | Stop | Plano | | 0.667 | | | | |
| 10 | Lens 4 | 1.445 | ASP | 0.961 | Plastic | 1.647 | 19.5 | 5.28 |
| 11 | | 1.848 | ASP | 1.000 | | | | |
| 12 | Filter | Plano | | 0.300 | Glass | 1.510 | 64.2 | — |
| 13 | | Plano | | 0.226 | | | | |
| 14 | Image | Plano | | — | | | | |

Note:
Reference wavelength is 850.0 nm.
The effective radius on surface #4 is 1.270 mm.
The effective radius on surface #9 is 1.440 mm.

TABLE 14

Aspheric Coefficients

| Surface # | | | | |
|---|---|---|---|---|
| | 2 | 3 | 5 | 6 |
| k = | −9.9285E+00 | −6.1655E+01 | 0.0000E+00 | 2.0000E+00 |
| A4 = | 5.0934E−02 | −1.9132E−02 | 6.6321E−02 | 1.1054E−01 |
| A6 = | −2.8150E−02 | −5.6666E−02 | −3.2008E−01 | −2.0958E−01 |
| A8 = | −1.2259E−02 | 2.6272E−02 | 3.5431E−01 | 9.5378E−02 |
| A10 = | 1.6621E−02 | −8.3309E−03 | −2.9922E−01 | 5.6091E−02 |
| A12 = | −8.0325E−03 | 7.2637E−04 | 1.3723E−01 | −1.1059E−01 |
| A14 = | | | −2.2756E−02 | 5.6037E−02 |
| A16 = | | | | −9.2837E−03 |

| Surface # | | | | |
|---|---|---|---|---|
| | 7 | 8 | 10 | 11 |
| k = | −9.8026E−01 | −6.2196E−01 | −1.5894E+00 | −7.2105E−01 |
| A4 = | 5.1378E−01 | 1.8479E−01 | −1.3994E−01 | −1.2883E−01 |
| A6 = | −7.2344E−01 | −3.4366E−01 | 8.2530E−02 | 6.0888E−02 |
| A8 = | 6.4565E−01 | 5.5125E−01 | −3.1377E−02 | −2.5676E−02 |
| A10 = | −3.1461E−01 | −5.5799E−01 | 5.9860E−03 | 6.8007E−03 |
| A12 = | 8.5811E−02 | 3.3607E−01 | −6.8703E−05 | −1.0003E−03 |
| A14 = | −1.0776E−02 | −1.0066E−01 | −1.6080E−04 | 6.2093E−05 |
| A16 = | 1.6441E−04 | 1.1588E−02 | 1.7538E−05 | −3.0544E−07 |

In the 7th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 7th embodiment are as specified below.

| 7th Embodiment | | | |
|---|---|---|---|
| f [mm] | 3.28 | (R7 + R8)/(R7 − R8) | −8.16 |
| Fno | 1.37 | f/f1 | 0.70 |
| HFOV [deg.] | 34.4 | (|f/f2| + |f/f3|)/(f/f1 + f/f4) | 0.14 |
| CT1/CT4 | 0.88 | f/f34 | 0.55 |
| CT2/T12 | 0.66 | f/f4 | 0.62 |
| CT2/T23 | 0.48 | f1/f4 | 0.89 |
| T12/T23 | 0.73 | f34/f12 | 1.25 |
| (R5 − R6)/(R5 + R6) | −0.13 | f4/|f3| | 0.27 |
| R6/R7 | −0.73 | EPD/CT2 | 8.27 |

8th Embodiment

Figure 8A:
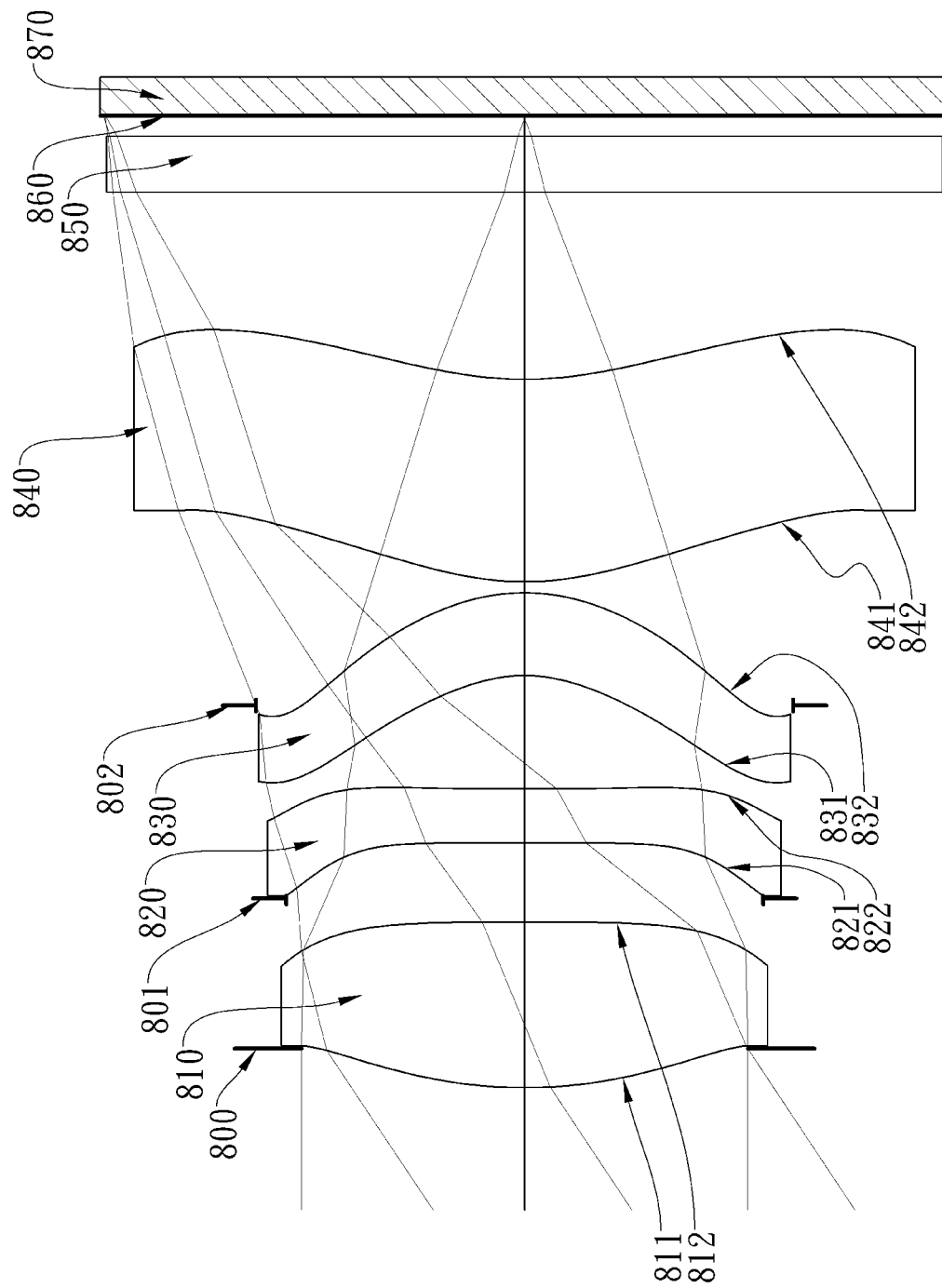
FIG. 8A is a schematic view of an image capturing apparatus according to the 8th embodiment of the present disclosure.
Figure 8B:
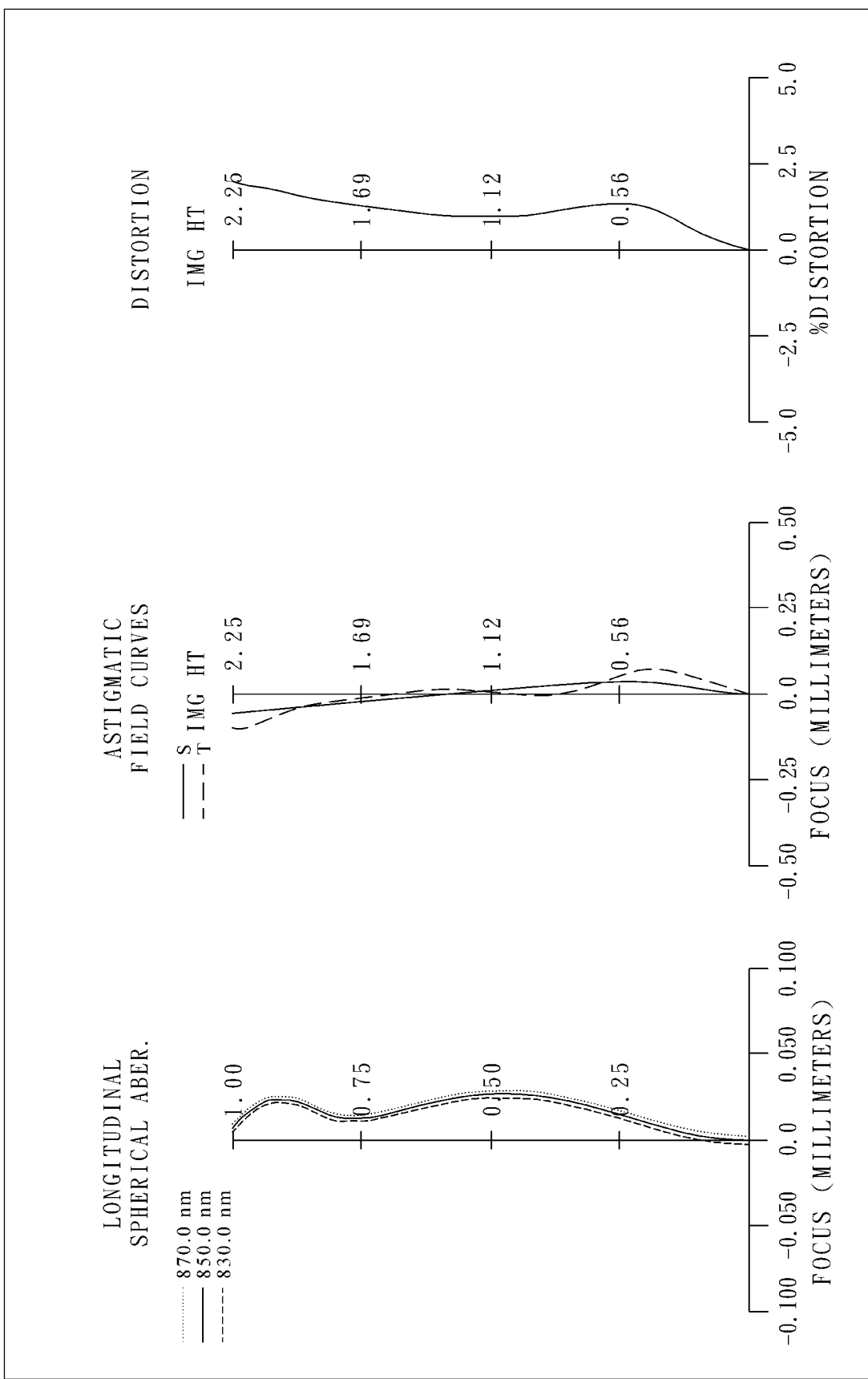
FIG. 8B shows longitudinal spherical aberration curves, astigmatic field curves and a distortion curve of the image capturing apparatus according to the 8th embodiment.

FIG. 8A is a schematic view of an image capturing apparatus according to the 8th embodiment of the present disclosure. FIG. 8B shows, in order from left to right, longitudinal spherical aberration curves, astigmatic field curves and a distortion curve of the image capturing apparatus according to the 8th embodiment.

In FIG. 8A, an image capturing apparatus comprises an optical photographing lens system (not otherwise herein labeled) of the present disclosure and an image sensor 870. The optical photographing lens system comprises, in order from an object side to an image side, an aperture stop 800, a first lens element 810, a stop 801, a second lens element 820, a third lens element 830, a stop 802, a fourth lens element 840, a filter 850 and an image surface 860, wherein the optical photographing lens system comprises four lens elements (810-840) with no additional lens element disposed between the first lens element 810 and the fourth lens element 840.

The first lens element 810 with positive refractive power has an object-side surface 811 being convex in a paraxial region thereof and an image-side surface 812 being convex in a paraxial region thereof, which are both aspheric, and the first lens element 810 is made of plastic.

The second lens element 820 with negative refractive power has an object-side surface 821 being concave in a paraxial region thereof and an image-side surface 822 being plane in a paraxial region thereof, which are both aspheric, and the second lens element 820 is made of plastic. Moreover, both the object-side surface 821 and the image-side surface 822 have at least one inflection point, respectively.

The third lens element 830 with negative refractive power has an object-side surface 831 being concave in a paraxial region thereof and an image-side surface 832 being convex in a paraxial region thereof, which are both aspheric, and the third lens element 830 is made of plastic. Moreover, the image-side surface 832 has at least one concave critical point in an off-axial region.

The fourth lens element 840 with positive refractive power has an object-side surface 841 being convex in a paraxial region thereof and an image-side surface 842 being concave in a paraxial region thereof, which are both aspheric, and the fourth lens element 840 is made of plastic. Moreover, the image-side surface 842 has at least one convex critical point in an off-axial region.

The filter 850 is located between the fourth lens element 840 and the image surface 860. The filter 850 is made of glass and does not affect the focal length of the optical photographing lens system. The image sensor 870 is disposed on or near the image surface 860 of the optical photographing lens system.

Also, both a focal length of the first lens element 810 and a focal length of the fourth lens element 840 are shorter than a focal length of the second lens element 820 and a focal length of the third lens element 830.

The detailed optical data of the 8th embodiment are shown in TABLE 15, and the aspheric surface data of the 8th embodiment are shown in TABLE 16.

TABLE 15

(8th Embodiment)
f = 3.31 mm, Fno = 1.39, HFOV = 33.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.209 | | | | |
| 2 | Lens 1 | 2.537 | ASP | 0.886 | Plastic | 1.536 | 55.9 | 4.51 |
| 3 | | −45.917 | ASP | 0.127 | | | | |
| 4 | Stop | Plano | | 0.296 | | | | |
| 5 | Lens 2 | −160.409 | ASP | 0.290 | Plastic | 1.637 | 20.4 | −251.70 |
| 6 | | ∞ | ASP | 0.607 | | | | |
| 7 | Lens 3 | −0.797 | ASP | 0.443 | Plastic | 1.597 | 26.0 | −19.76 |
| 8 | | −1.032 | ASP | −0.604 | | | | |
| 9 | Stop | Plano | | 0.663 | | | | |
| 10 | Lens 4 | 1.545 | ASP | 1.083 | Plastic | 1.637 | 20.4 | 5.76 |
| 11 | | 1.939 | ASP | 1.000 | | | | |
| 12 | Filter | Plano | | 0.300 | Glass | 1.510 | 64.2 | — |
| 13 | | Plano | | 0.103 | | | | |
| 14 | Image | Plano | | — | | | | |

Note:
Reference wavelength is 850.0 nm.
The effective radius on surface #4 is 1.275 mm.
The effective radius on surface #9 is 1.435 mm.

TABLE 16

Aspheric Coefficients

| Surface # | | | | |
|---|---|---|---|---|
| | 2 | 3 | 5 | 6 |
| k = | −8.1072E+00 | −9.0000E+01 | 6.0000E+00 | 0.0000E+00 |
| A4 = | 5.2168E−02 | −1.9776E−02 | 6.5309E−02 | 1.1035E−01 |
| A6 = | −2.7958E−02 | −5.6625E−02 | −3.2469E−01 | −2.1014E−01 |
| A8 = | −1.0335E−02 | 2.5371E−02 | 3.5290E−01 | 9.4168E−02 |
| A10 = | 1.6346E−02 | −8.0317E−03 | −2.9650E−01 | 5.5595E−02 |
| A12 = | −8.3555E−03 | 7.0525E−04 | 1.3723E−01 | −1.0989E−01 |
| A14 = | | | −2.2849E−02 | 5.6059E−02 |
| A16 = | | | | −9.2753E−03 |

| Surface # | | | | |
|---|---|---|---|---|
| | 7 | 8 | 10 | 11 |
| k = | −9.8313E−01 | −6.2786E−01 | −1.5117E+00 | −1.7857E+00 |
| A4 = | 5.1474E−01 | 1.8858E−01 | −1.5041E−01 | −1.1613E−01 |
| A6 = | −7.2332E−01 | −3.4399E−01 | 8.4983E−02 | 6.2274E−02 |
| A8 = | 6.4631E−01 | 5.5306E−01 | −3.1988E−02 | −2.6136E−02 |
| A10 = | −3.1418E−01 | −5.5708E−01 | 6.0965E−03 | 6.8299E−03 |
| A12 = | 8.5709E−02 | 3.3611E−01 | −1.7241E−05 | −9.9558E−04 |
| A14 = | −1.0800E−02 | −1.0081E−01 | −2.0378E−04 | 5.9324E−05 |
| A16 = | 1.6441E−04 | 1.1588E−02 | 2.4137E−05 | 1.6104E−07 |

In the 8th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 8th embodiment are as specified below.

| 8th Embodiment | | | |
|---|---|---|---|
| f [mm] | 3.31 | (R7 + R8)/(R7 − R8) | −8.84 |
| Fno | 1.39 | f/f1 | 0.73 |
| HFOV [deg.] | 33.6 | (|f/f2| + |f/f3|)/(f/f1 + f/f4) | 0.14 |
| CT1/CT4 | 0.82 | f/f34 | 0.49 |
| CT2/T12 | 0.69 | f/f4 | 0.58 |
| CT2/T23 | 0.48 | f1/f4 | 0.78 |
| T12/T23 | 0.70 | f34/f12 | 1.47 |
| (R5 − R6)/(R5 + R6) | −0.13 | f4/|f3| | 0.29 |
| R6/R7 | −0.67 | EPD/CT2 | 8.21 |

9th Embodiment

Figure 9A:
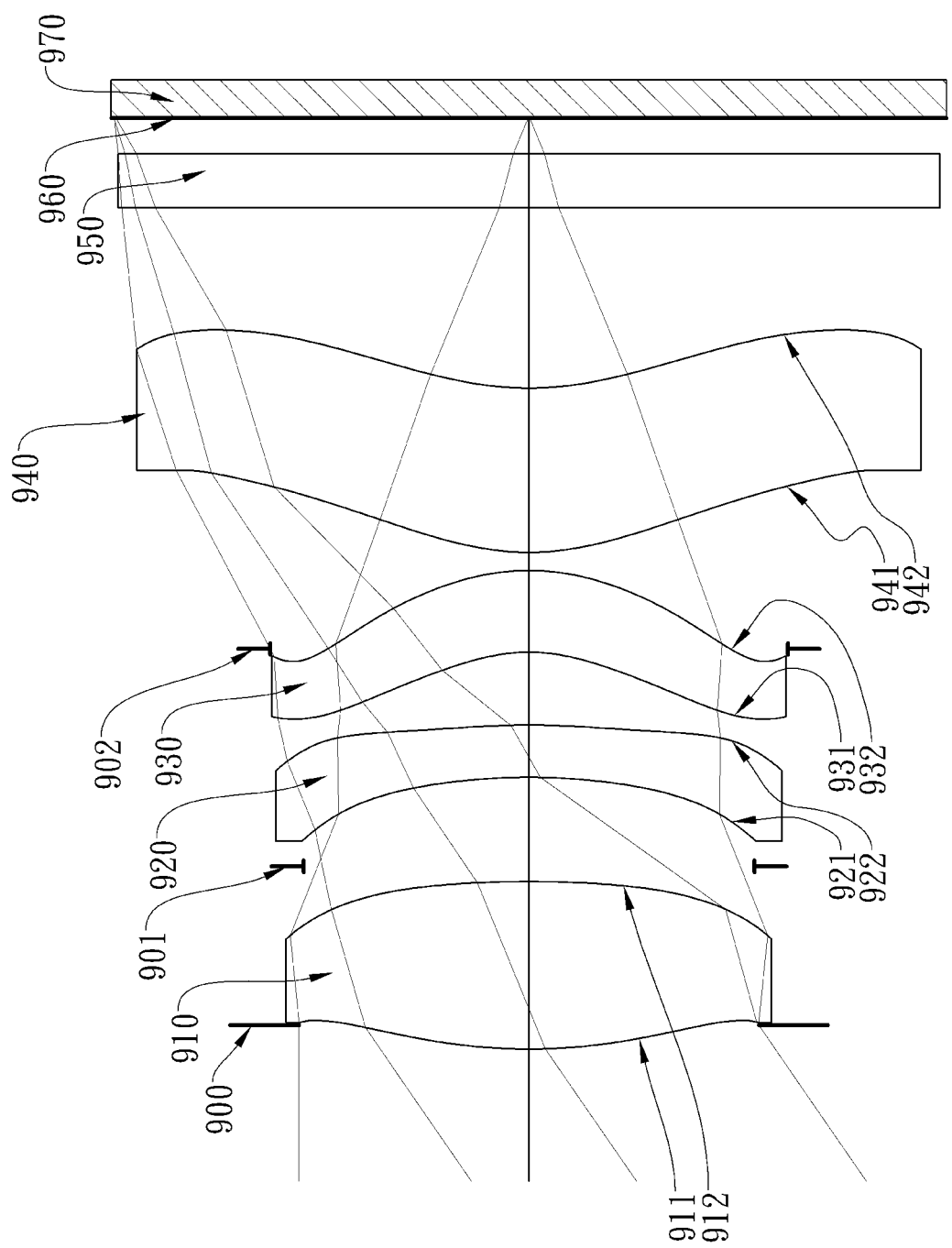
FIG. 9A is a schematic view of an image capturing apparatus according to the 9th embodiment of the present disclosure.
Figure 9B:
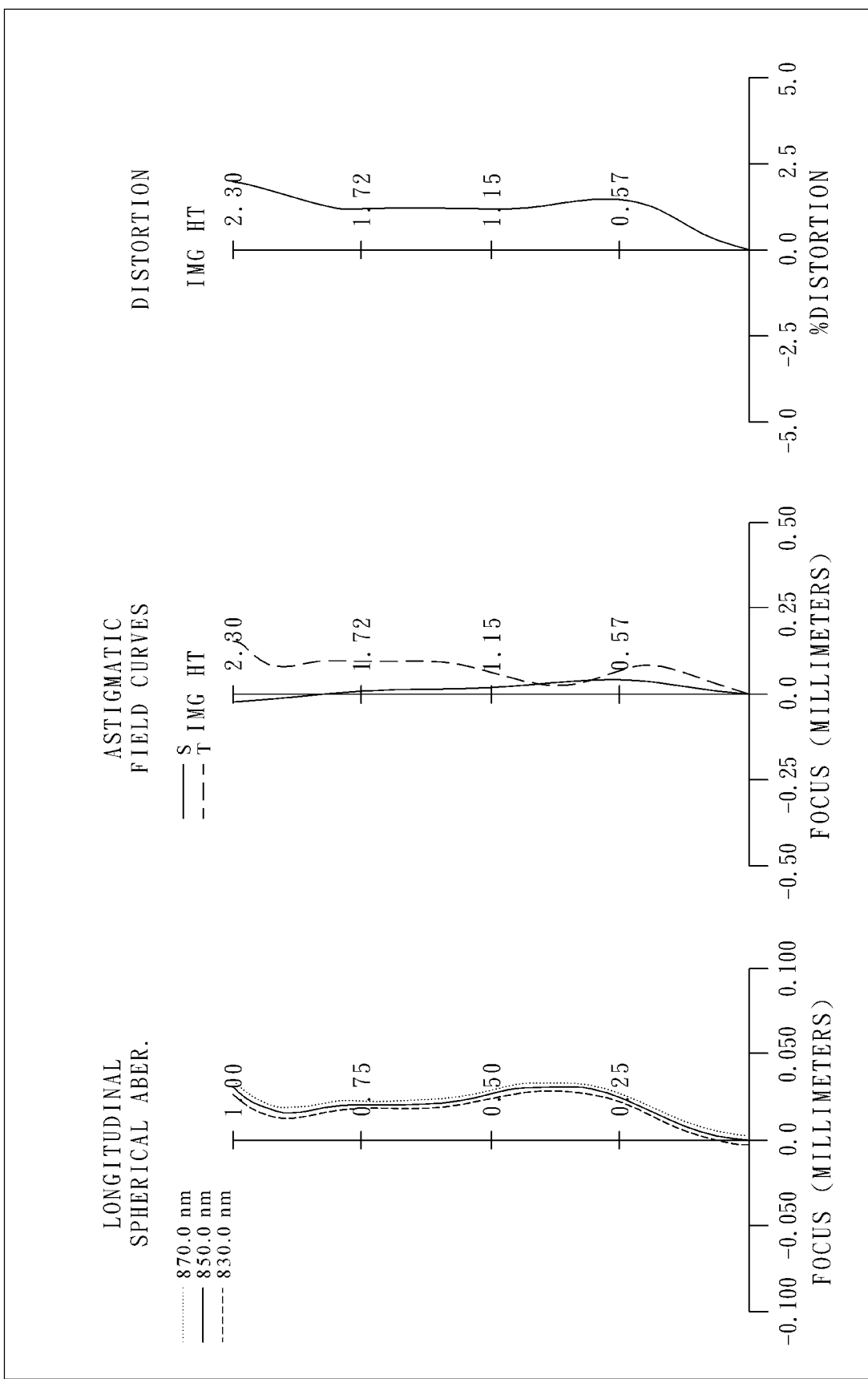
FIG. 9B shows longitudinal spherical aberration curves, astigmatic field curves and a distortion curve of the image capturing apparatus according to the 9th embodiment.

FIG. 9A is a schematic view of an image capturing apparatus according to the 9th embodiment of the present disclosure. FIG. 9B shows, in order from left to right, longitudinal spherical aberration curves, astigmatic field curves and a distortion curve of the image capturing apparatus according to the 9th embodiment.

In FIG. 9A, an image capturing apparatus comprises an optical photographing lens system (not otherwise herein labeled) of the present disclosure and an image sensor 970. The optical photographing lens system comprises, in order from an object side to an image side, an aperture stop 900, a first lens element 910, a stop 901, a second lens element 920, a third lens element 930, a stop 902, a fourth lens element 940, a filter 950 and an image surface 960, wherein the optical photographing lens system comprises four lens elements (910-940) with no additional lens element disposed between the first lens element 910 and the fourth lens element 940.

The first lens element 910 with positive refractive power has an object-side surface 911 being convex in a paraxial region thereof and an image-side surface 912 being convex in a paraxial region thereof, which are both aspheric, and the first lens element 910 is made of plastic.

The second lens element 920 with negative refractive power has an object-side surface 921 being concave in a paraxial region thereof and an image-side surface 922 being convex in a paraxial region thereof, which are both aspheric, and the second lens element 920 is made of plastic. Moreover, the image-side surface 922 has at least one inflection point.

The third lens element 930 with negative refractive power has an object-side surface 931 being concave in a paraxial region thereof and an image-side surface 932 being convex in a paraxial region thereof, which are both aspheric, and the third lens element 930 is made of plastic. Moreover, the image-side surface 932 has at least one concave critical point in an off-axial region.

The fourth lens element 940 with positive refractive power has an object-side surface 941 being convex in a paraxial region thereof and an image-side surface 942 being concave in a paraxial region thereof, which are both aspheric, and the fourth lens element 940 is made of plastic. Moreover, the image-side surface 942 has at least one convex critical point in an off-axial region.

The filter 950 is located between the fourth lens element 940 and the image surface 960. The filter 950 is made of glass and does not affect the focal length of the optical photographing lens system. The image sensor 970 is disposed on or near the image surface 960 of the optical photographing lens system.

Also, both a focal length of the first lens element 910 and a focal length of the fourth lens element 940 are shorter than a focal length of the second lens element 920 and a focal length of the third lens element 930.

The detailed optical data of the 9th embodiment are shown in TABLE 17, and the aspheric surface data of the 9th embodiment are shown in TABLE 18.

TABLE 17

(9th Embodiment)
f = 3.26 mm, Fno = 1.28, HFOV = 34.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.132 | | | | |
| 2 | Lens 1 | 3.065 | ASP | 0.929 | Plastic | 1.548 | 40.4 | 3.97 |
| 3 | | −6.693 | ASP | 0.085 | | | | |
| 4 | Stop | Plano | | 0.494 | | | | |
| 5 | Lens 2 | −3.262 | ASP | 0.290 | Plastic | 1.615 | 23.8 | −33.81 |
| 6 | | −4.000 | ASP | 0.405 | | | | |
| 7 | Lens 3 | −0.941 | ASP | 0.453 | Plastic | 1.647 | 19.5 | −17.13 |
| 8 | | −1.222 | ASP | −0.435 | | | | |
| 9 | Stop | Plano | | 0.535 | | | | |
| 10 | Lens 4 | 1.407 | ASP | 0.912 | Plastic | 1.647 | 19.5 | 5.62 |
| 11 | | 1.711 | ASP | 1.000 | | | | |
| 12 | Filter | Plano | | 0.300 | Glass | 1.510 | 64.2 | — |
| 13 | | Plano | | 0.198 | | | | |
| 14 | Image | Plano | | — | | | | |

Note:
Reference wavelength is 850.0 nm.
The effective radius on surface #4 is 1.250 mm.
The effective radius on surface #9 is 1.435 mm.

TABLE 18

Aspheric Coefficients

| | Surface # | | | |
|---|---|---|---|---|
| | 2 | 3 | 5 | 6 |
| k = | −1.3018E+01 | 4.2729E+00 | −4.1958E+00 | −1.8002E+01 |
| A4 = | 4.3644E−02 | −1.7612E−02 | 7.7581E−02 | 1.5602E−01 |
| A6 = | −3.2612E−02 | −4.0588E−02 | −2.8055E−01 | −1.9696E−01 |
| A8 = | −1.5547E−02 | 2.6764E−02 | 3.7566E−01 | 9.7083E−02 |
| A10 = | 2.1340E−02 | −1.0547E−02 | −3.1834E−01 | 4.9543E−02 |
| A12 = | −8.3554E−03 | 1.1629E−03 | 1.3723E−01 | −1.1049E−01 |
| A14 = | 1.4504E−09 | 3.0507E−10 | −2.2849E−02 | 5.6059E−02 |
| A16 = | | | | −9.2753E−03 |

TABLE 18-continued

| Aspheric Coefficients | | | | |
|---|---|---|---|---|
| | Surface # | | | |
| | 7 | 8 | 10 | 11 |
| k = | −1.0708E+00 | −4.9083E−01 | −1.7259E+00 | −1.4714E+00 |
| A4 = | 5.3748E−01 | 1.8909E−01 | −1.4341E−01 | −1.1378E−01 |
| A6 = | −7.1871E−01 | −3.3642E−01 | 8.3050E−02 | 5.3162E−02 |
| A8 = | 6.3762E−01 | 5.4769E−01 | −3.4002E−02 | −2.2957E−02 |
| A10 = | −3.1894E−01 | −5.5738E−01 | 7.2786E−03 | 6.3752E−03 |
| A12 = | 8.7598E−02 | 3.3596E−01 | −1.4967E−04 | −9.6665E−04 |
| A14 = | −1.0783E−02 | −1.0072E−01 | −2.0217E−04 | 6.6205E−05 |
| A16 = | 1.6440E−04 | 1.1588E−02 | 2.2900E−05 | −1.3484E−06 |

In the 9th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 9th embodiment are as specified below.

| 9th Embodiment | | | |
|---|---|---|---|
| f [mm] | 3.26 | (R7 + R8)/(R7 − R8) | −10.26 |
| Fno | 1.28 | f/f1 | 0.82 |
| HFOV [deg.] | 34.6 | (|f/f2| + |f/f3|)/(f/f1 + f/f4) | 0.20 |
| CT1/CT4 | 1.02 | f/f34 | 0.46 |
| CT2/T12 | 0.50 | f/f4 | 0.58 |
| CT2/T23 | 0.72 | f1/f4 | 0.71 |
| T12/T23 | 1.43 | f34/f12 | 1.57 |
| (R5 − R6)/(R5 + R6) | −0.13 | f4/|f3| | 0.33 |
| R6/R7 | −0.87 | EPD/CT2 | 8.79 |

10th Embodiment

Figure 10A:
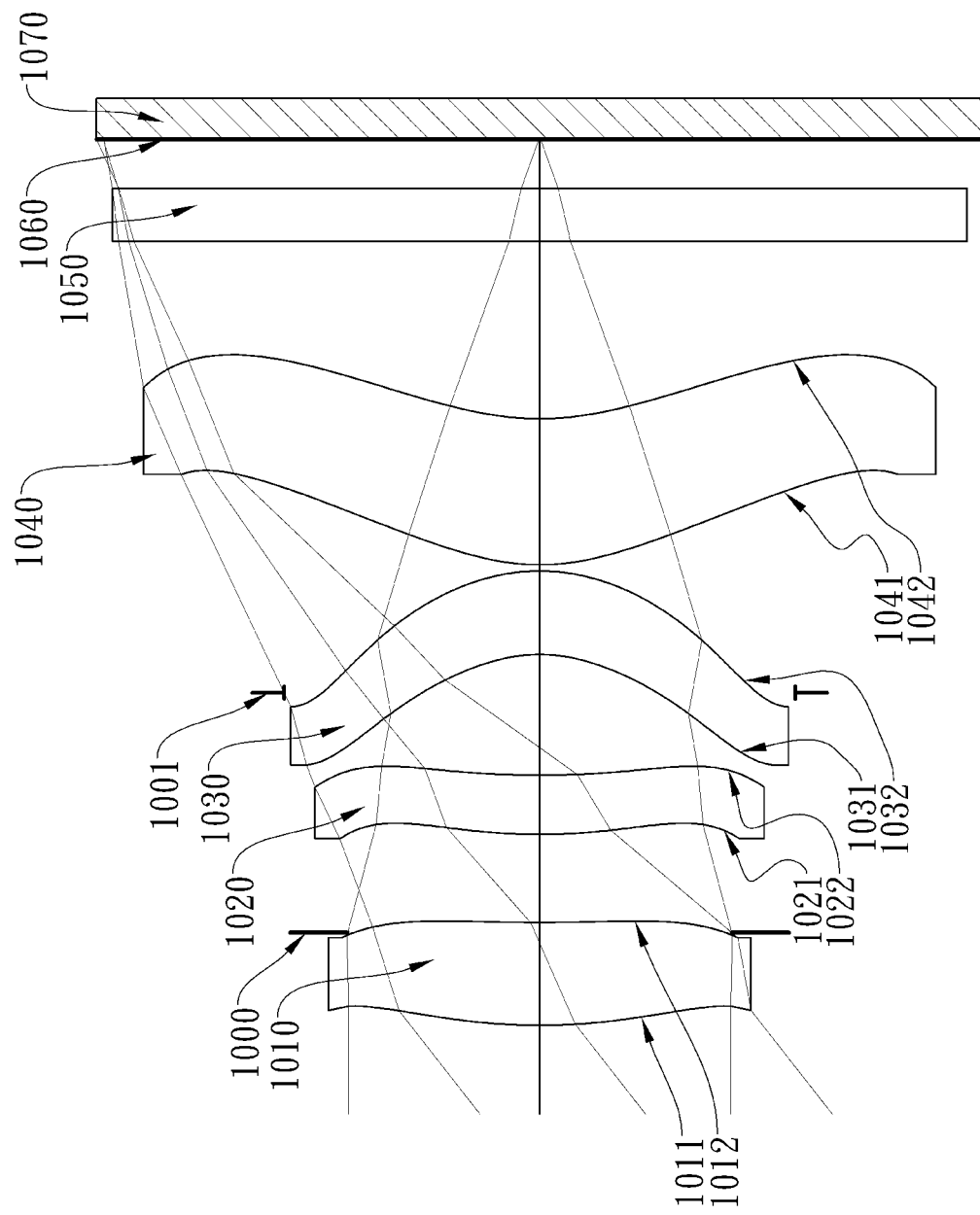
FIG. 10A is a schematic view of an image capturing apparatus according to the 10th embodiment of the present disclosure.
Figure 10B:
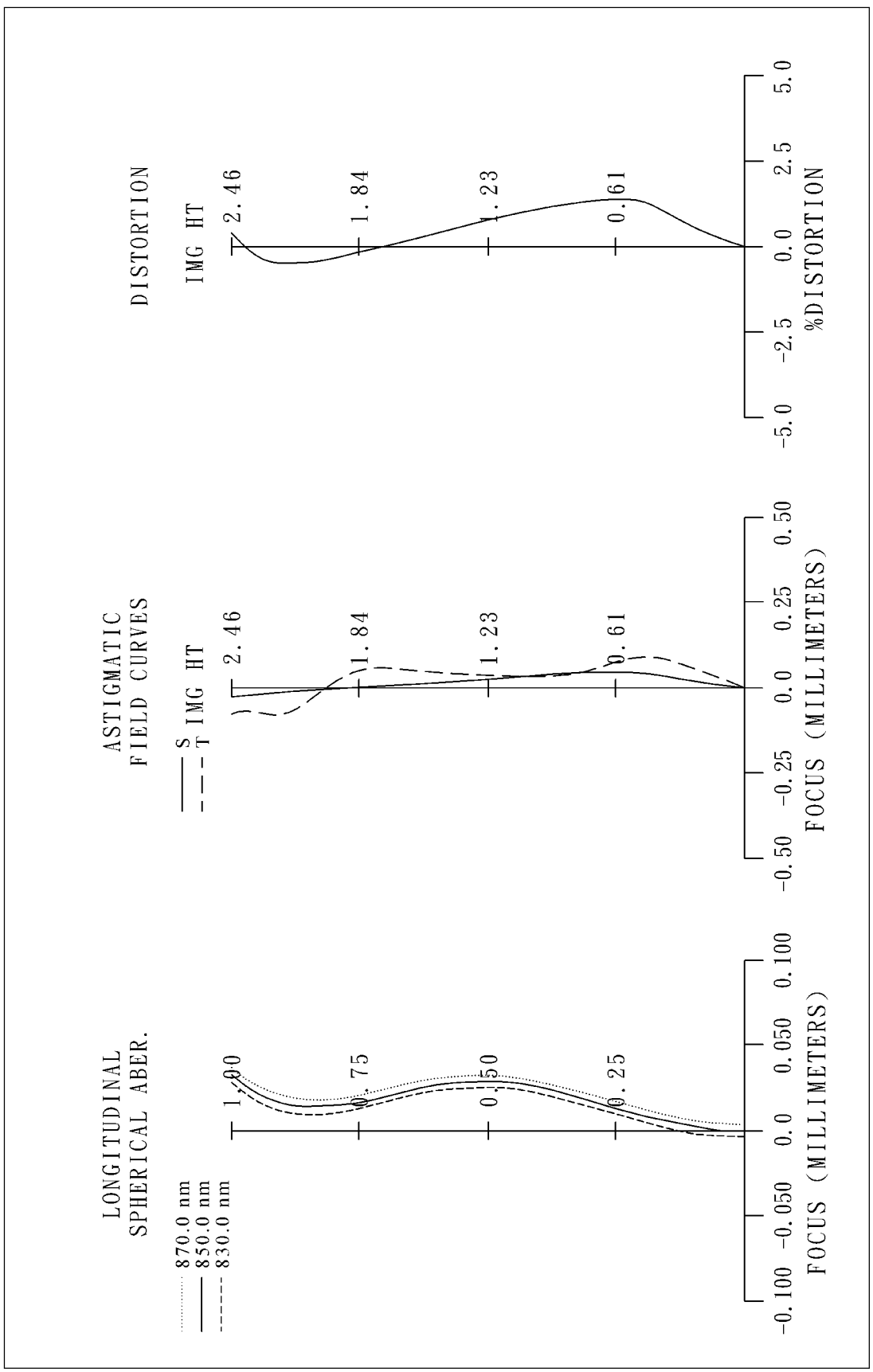
FIG. 10B shows longitudinal spherical aberration curves, astigmatic field curves and a distortion curve of the image capturing apparatus according to the 10th embodiment.

FIG. 10A is a schematic view of an image capturing apparatus according to the 10th embodiment of the present disclosure. FIG. 10B shows, in order from left to right, longitudinal spherical aberration curves, astigmatic field curves and a distortion curve of the image capturing apparatus according to the 10th embodiment.

In FIG. 10A, an image capturing apparatus comprises an optical photographing lens system (not otherwise herein labeled) of the present disclosure and an image sensor 1070. The optical photographing lens system comprises, in order from an object side to an image side, a first lens element 1010, an aperture stop 1000, a second lens element 1020, a third lens element 1030, a stop 1001, a fourth lens element 1040, a filter 1050 and an image surface 1060, wherein the optical photographing lens system comprises four lens elements (1010-1040) with no additional lens element disposed between the first lens element 1010 and the fourth lens element 1040.

The first lens element 1010 with positive refractive power has an object-side surface 1011 being convex in a paraxial region thereof and an image-side surface 1012 being concave in a paraxial region thereof, which are both aspheric, and the first lens element 1010 is made of plastic.

The second lens element 1020 with positive refractive power has an object-side surface 1021 being convex in a paraxial region thereof and an image-side surface 1022 being concave in a paraxial region thereof, which are both aspheric, and the second lens element 1020 is made of plastic. Moreover, both the object-side surface 1021 and the image-side surface 1022 have at least one inflection point, respectively.

The third lens element 1030 with negative refractive power has an object-side surface 1031 being concave in a paraxial region thereof and an image-side surface 1032 being convex in a paraxial region thereof, which are both aspheric, and the third lens element 1030 is made of plastic. Moreover, the image-side surface 1032 has at least one concave critical point in an off-axial region.

The fourth lens element 1040 with positive refractive power has an object-side surface 1041 being convex in a paraxial region thereof and an image-side surface 1042 being concave in a paraxial region thereof, which are both aspheric, and the fourth lens element 1040 is made of plastic. Moreover, the image-side surface 1042 has at least one convex critical point in an off-axial region.

The filter 1050 located between the fourth lens element 1040 and the image surface 1060. The filter 1050 is made of glass and does not affect the focal length of the optical photographing lens system. The image sensor 1070 is disposed on or near the image surface 1060 of the optical photographing lens system.

Also, both a focal length of the first lens element 1010 and a focal length of the fourth lens element 1040 are shorter than a focal length of the second lens element 1020 and a focal length of the third lens element 1030.

The detailed optical data of the 10th embodiment are shown in TABLE 19, and the aspheric surface data of the 10th embodiment are shown in TABLE 20.

TABLE 19

(10th Embodiment)
f = 3.12 mm, Fno = 1.45, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.292 | ASP | 0.580 | Plastic | 1.647 | 19.5 | 7.17 |

TABLE 19-continued (10th Embodiment)
f = 3.12 mm, Fno = 1.45, HFOV = 38.0 deg.

| Surface # | | Curvature Radius | | Thickness | Material | Index | Abbe # | Focal Length |
|---|---|---|---|---|---|---|---|---|
| 2 | | 10.549 | ASP | −0.057 | | | | |
| 3 | Ape. Stop | Plano | | 0.554 | | | | |
| 4 | Lens 2 | 3.197 | ASP | 0.334 | Plastic | 1.647 | 19.5 | 12.20 |
| 5 | | 5.153 | ASP | 0.682 | | | | |
| 6 | Lens 3 | −0.855 | ASP | 0.471 | Plastic | 1.619 | 23.5 | −40.94 |
| 7 | | −1.071 | ASP | −0.687 | | | | |
| 8 | Stop | Plano | | 0.722 | | | | |
| 9 | Lens 4 | 1.240 | ASP | 0.824 | Plastic | 1.548 | 40.4 | 5.61 |
| 10 | | 1.588 | ASP | 1.000 | | | | |
| 11 | Filter | Plano | | 0.300 | Glass | 1.510 | 64.2 | — |
| 12 | | Plano | | 0.277 | | | | |
| 13 | Image | Plano | | — | | | | |

Note:
Reference wavelength is 850.0 nm.
The effective radius on surface #8 is 1.440 mm.

TABLE 20

Aspheric Coefficients

| | Surface # | | | |
|---|---|---|---|---|
| | 1 | 2 | 4 | 5 |
| k = | −1.0549E+01 | −9.0000E+01 | −3.2401E+01 | −9.0000E+01 |
| A4 = | 1.9563E−02 | −5.3387E−02 | 9.0776E−02 | 1.0640E−01 |
| A6 = | −4.6717E−02 | −4.2089E−02 | −3.0451E−01 | −2.1031E−01 |
| A8 = | 4.8715E−03 | 2.1515E−02 | 3.3248E−01 | 9.1593E−02 |
| A10 = | 9.0434E−03 | −9.9953E−03 | −3.0020E−01 | 5.3401E−02 |
| A12 = | −8.0448E−03 | 1.8719E−03 | 1.3858E−01 | −1.0949E−01 |
| A14 = | 6.2082E−09 | 4.0106E−09 | −2.3585E−02 | 5.6274E−02 |
| A16 = | | | | −9.2999E−03 |

| | Surface # | | | |
|---|---|---|---|---|
| | 6 | 7 | 9 | 10 |
| k = | −7.9085E−01 | −5.9791E−01 | −2.4228E+00 | −8.0848E−01 |
| A4 = | 4.7212E−01 | 1.3608E−01 | −1.2605E−01 | −1.5270E−01 |
| A6 = | −7.2837E−01 | −3.2491E−01 | 8.7874E−02 | 6.8535E−02 |
| A8 = | 6.7907E−01 | 5.4837E−01 | −3.4392E−02 | −2.6390E−02 |
| A10 = | −3.2087E−01 | −5.6290E−01 | 5.7519E−03 | 6.4325E−03 |
| A12 = | 8.5288E−02 | 3.3845E−01 | 2.6457E−04 | −9.6005E−04 |
| A14 = | −1.0796E−02 | −1.0060E−01 | −2.2098E−04 | 7.9065E−05 |
| A16 = | 2.4296E−04 | 1.1527E−02 | 2.0486E−05 | −2.8733E−06 |

In the 10th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 10th embodiment are as specified below.

| 10th Embodiment | | | |
|---|---|---|---|
| f [mm] | 3.12 | (R7 + R8)/(R7 − R8) | −8.12 |
| Fno | 1.45 | f/f1 | 0.44 |
| HFOV [deg.] | 38.0 | (|f/f2| + |f/f3|)/(f/f1 + f/f4) | 0.33 |
| CT1/CT4 | 0.70 | f/f34 | 0.58 |
| CT2/T12 | 0.67 | f/f4 | 0.56 |
| CT2/T23 | 0.49 | f1/f4 | 1.28 |
| T12/T23 | 0.73 | f34/f12 | 1.14 |
| (R5 − R6)/(R5 + R6) | −0.11 | f4/|f3| | 0.14 |
| R6/R7 | −0.86 | EPD/CT2 | 6.45 |

11th Embodiment

Figure 11:
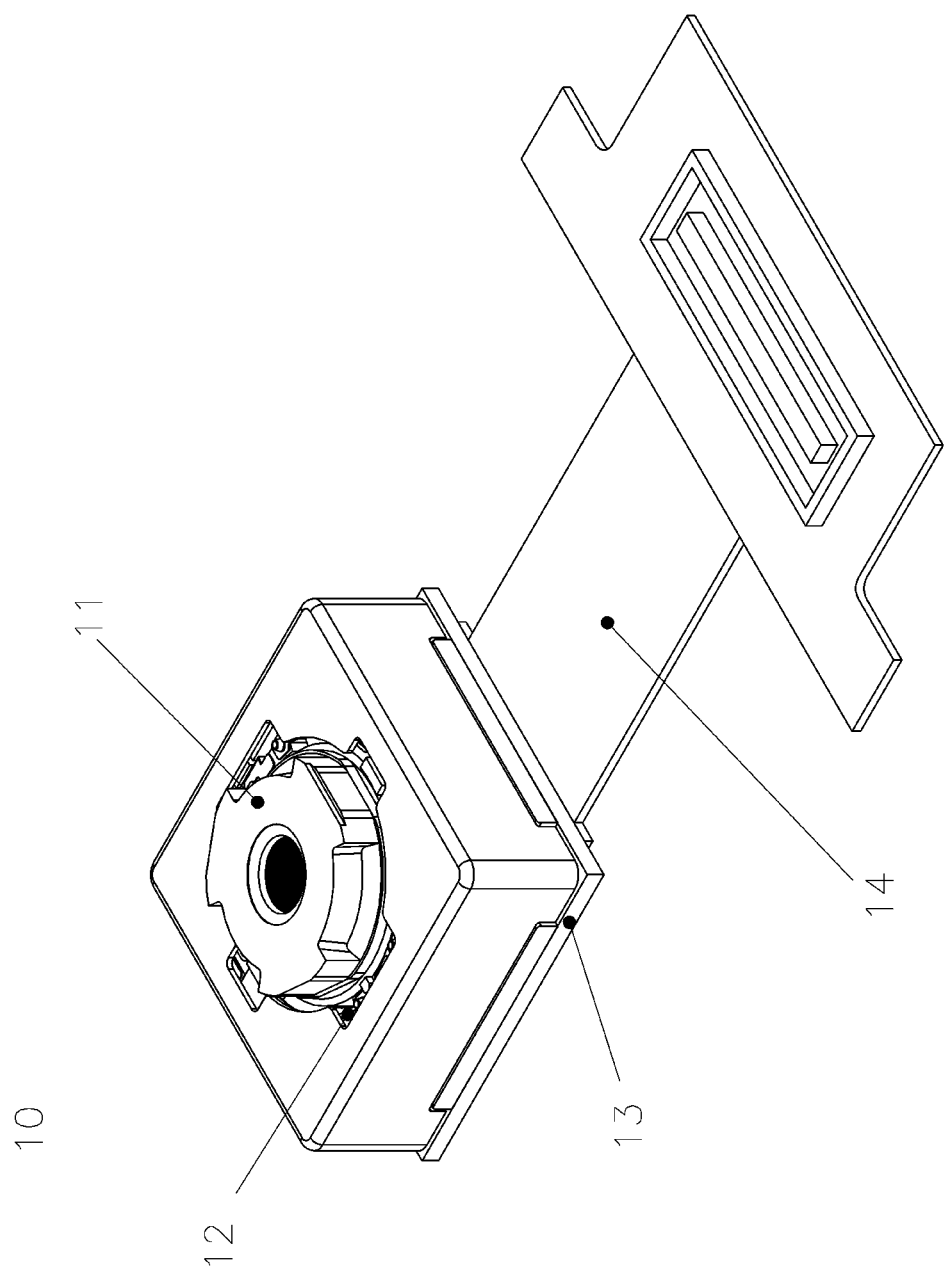
FIG. 11 is a 3-dimensional schematic view of an image capturing apparatus according to the 11th embodiment of the present disclosure.

FIG. 11 is a 3-dimensional schematic view of an image capturing apparatus 10 according to the 11th embodiment of the present disclosure. In the present embodiment, the image capturing apparatus 10 is a camera module, comprising a lens unit 11, a driving apparatus 12, an image sensor 13 and a wire circuit 14. The lens unit 11 includes the optical photographing lens system of the aforementioned 2nd embodiment, a barrel (not otherwise herein labeled) and a holder member (not otherwise herein labeled) for holding the optical photographing lens system. The external light converges into the lens unit 11 of the image capturing apparatus 10 to generate an image, and the lens unit 11 along with the driving apparatus 12 is utilized for image focusing on the image sensor 13. Then, the image of the imaged object 30 (shown in FIG. 12A) is digitally transmitted to an electronic component by the wire circuit 14.

The driving apparatus 12 may have auto focusing functionality, and different driving configurations may be through the use of voice coil motors (VCM), micro electromechanical systems (MEMS), piezoelectric systems, or shape memory alloy materials. The driving apparatus 12 is favorable for the lens unit 11 to obtain a better imaging position, so that a clear image of the imaged object 30 can be captured by the lens unit 11 with different object distances. The image sensor 13 (for example, CCD or CMOS) can be featured with high photosensitivity and low noise, disposed on the image surface of the optical photographing lens system to provide higher image quality.

There can be a dynamic sensing element 26 (shown in FIG. 12A), such as an accelerometer, a gyroscope and a Hall effect sensor, configured to work with the driving apparatus 12, so that the driving apparatus 12 can provide optical image stabilization (OIS). The driving apparatus 12 working with the dynamic sensing element 26 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 12A:
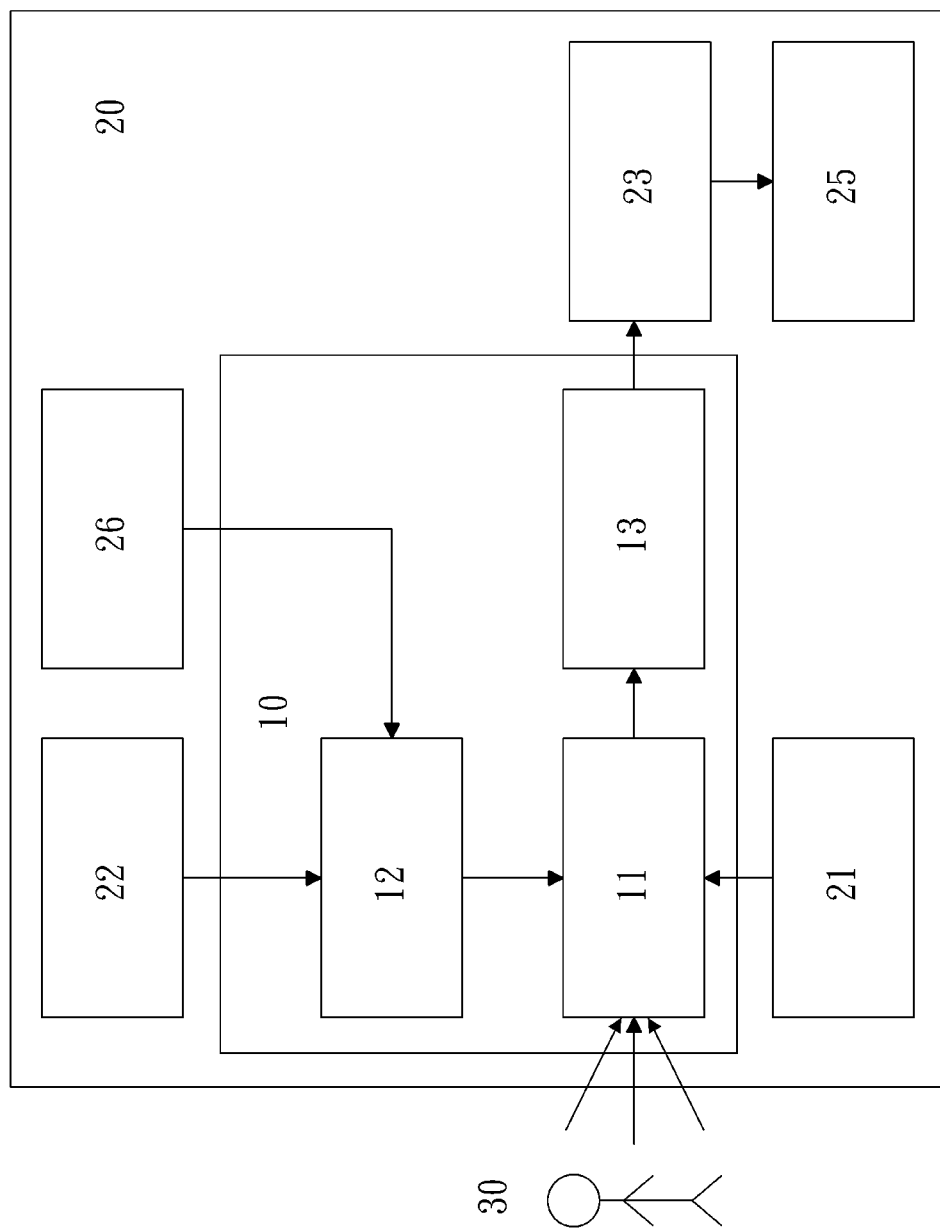
FIG. 12A is a schematic view of an electronic device according to the 12th embodiment of the present disclosure.
Figure 12B:
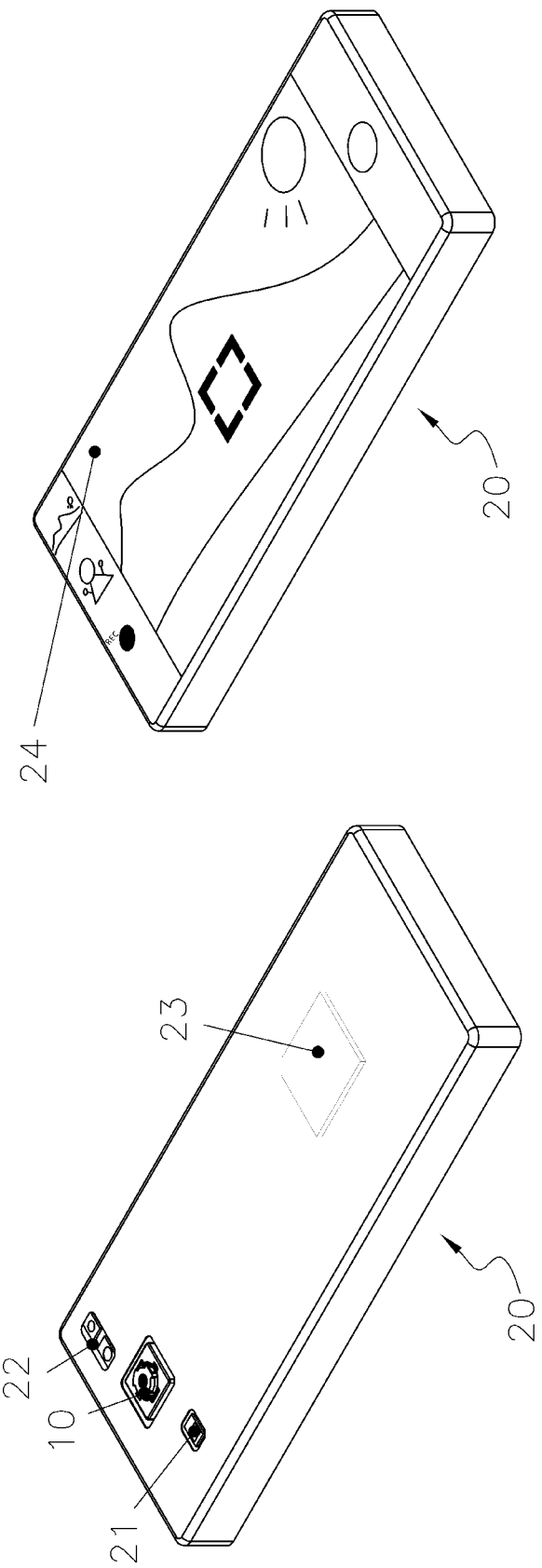
FIG. 12B is a 3-dimensional schematic view of the electronic device according to the 12th embodiment.

FIG. 12A is a schematic view of an electronic device 20 according to the 12th embodiment, and FIG. 12B is a 3-dimensional schematic view of the electronic device shown in FIG. 12A. In the present embodiment, the electronic device 20 is a smart phone. The electronic device 20 comprises the image capturing apparatus 10 in the 11th embodiment, a flash module 21, a focus assist module 22, an image signal processor 23, a user interface 24, an image software processor 25 and a dynamic sensing element 26.

As a user interacts with the user interface 24 to capture images, light converges into the image capturing apparatus 10 to generate images, and the flash module 21 is activated for light supplement. The focus assist module 22 detects the object distance of the imaged object 30 to achieve fast image auto-focus. The image signal processor 23 is configured to optimize the captured image to improve image quality. The light beam emitted from the focus assist module 22 can be infrared light or laser. The user interface 24 can be a touch screen or a physical button. The user is able to interact with the user interface 24 and the image software processor 25 having multiple functions to capture images and complete image processing.

The image capturing apparatus 10 of the present disclosure is not limited to a smart phone. Featuring both excellent aberration correction and high image quality, the image capturing apparatus 10 can further be applied to a system with moving focus on demand. To illustrate, the image capturing apparatus 10 may be used in a variety of electronics applications such as smart electronic devices, tablets, wearable devices, medical devices, precision instruments, car devices, security cameras, portable video recorders, recognition systems, multi-lens device, motion sensing technology, virtual reality, sports devices and smart home systems. The aforementioned electronic apparatus is merely exemplary of practical use of the present disclosure and does not limit the scope of application of the image capturing apparatus of the present disclosure.

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens system comprising, in order from an object side to an image side:
a first lens element with positive refractive power having an object-side surface being convex in a paraxial region thereof;
a second lens element;
a third lens element having an image-side surface being convex in a paraxial region thereof; and
a fourth lens element with positive refractive power having an object-side surface being convex in a paraxial region thereof and an image-side surface being concave in a paraxial region thereof, the image-side surface of the fourth lens element having at least one convex critical point in an off-axial region thereof;
wherein a total number of lens elements of the optical photographing lens system is four, both of an absolute value of a focal length of the first lens element and an absolute value of a focal length of the fourth lens element are smaller than both of an absolute value of a focal length of the second lens element and an absolute value of a focal length of the third lens element, a focal length of the optical photographing lens system is f, the focal length of the first lens element is f1, the focal length of the fourth lens element is f4, a curvature radius of the image-side surface of the third lens element is R6, a curvature radius of the object-side surface of the fourth lens element is R7, and the following conditions are satisfied:

$$0 < f/f1 < 0.90;$$

$$0.20 < f/f4 < 0.90; \text{ and}$$

$$-2.5 < R6/R7 < 0.$$

2. The optical photographing lens system of claim 1, wherein a central thickness of the first lens element is CT1, a central thickness of the fourth lens element is CT4, and the following condition is satisfied:

$$0.2 < CT1/CT4 < 1.2.$$

3. The optical photographing lens system of claim 1, wherein both an object-side surface and an image-side surface of the second lens element are aspheric and have at least one inflection point, respectively, a central thickness of the second lens element is CT2, an axial distance between the first lens element and the second lens element is T12, and the following condition is satisfied:

$$0.1 < CT2/T12 < 1.2.$$

4. The optical photographing lens system of claim 1, wherein a curvature radius of an object-side surface of the third lens element is R5, the curvature radius of the image-side surface of the third lens element is R6, and the following condition is satisfied:

$$-0.28 < (R5-R6)/(R5+R6) < 0.24.$$

5. The optical photographing lens system of claim 1, wherein an f-number of the optical photographing lens system is Fno, and the following condition is satisfied:

0.8<Fno<2.0.

6. The optical photographing lens system of claim 1, wherein the optical photographing lens system is applicable to infrared wavelengths ranging from 780.0 nm to 1100.0 nm.

7. An optical photographing lens system comprising, in order from an object side to an image side:
 a first lens element with positive refractive power having an object-side surface being convex in a paraxial region thereof;
 a second lens element;
 a third lens element; and
 a fourth lens element with positive refractive power having an object-side surface being convex in a paraxial region thereof and an image-side surface being concave in a paraxial region thereof, the image-side surface of the fourth lens element having at least one convex critical point in an off-axial region thereof;
 wherein a total number of lens elements of the optical photographing lens system is four, both of an absolute value of a focal length of the first lens element and an absolute value of a focal length of the fourth lens element are smaller than both of an absolute value of a focal length of the second lens element and an absolute value of a focal length of the third lens element, a focal length of the optical photographing lens system is f, the focal length of the first lens element is f1, the focal length of the second lens element is f2, the focal length of the third lens element is f3, the focal length of the fourth lens element is f4, and the following conditions are satisfied:

0<f/f1<0.90;

0.20<f/f4<0.90; and

0<(|f/f2|+|f/f3|)/(f/f1+f/f4)≤0.33.

8. The optical photographing lens system of claim 7, wherein an axial distance between the first lens element and the second lens element is T12, an axial distance between the second lens element and the third lens element is T23, and the following condition is satisfied:

0.25<T12/T23<1.60.

9. The optical photographing lens system of claim 7, wherein a curvature radius of the object-side surface of the fourth lens element is R7, a curvature radius of the image-side surface of the fourth lens element is R8, and the following condition is satisfied:

−100<(R7+R8)/(R7−R8)<−1.50.

10. The optical photographing lens system of claim 7, wherein the third lens element has an object-side surface being concave in a paraxial region thereof, the focal length of the first lens element is f1, the focal length of the fourth lens element is f4, and the following condition is satisfied:

0.25<f1/f4<1.33.

11. The optical photographing lens system of claim 7, wherein an entrance pupil diameter of the optical photographing lens system is EPD, a central thickness of the second lens element is CT2, and the following condition is satisfied:

7.0<EPD/CT2<20.0.

12. The optical photographing lens system of claim 7, wherein the optical photographing lens system is applicable to infrared wavelengths ranging from 780.0 nm to 1100.0 nm.

13. An optical photographing lens system comprising, in order from an object side to an image side:
 a first lens element with positive refractive power having an object-side surface being convex in a paraxial region thereof;
 a second lens element;
 a third lens element; and
 a fourth lens element with positive refractive power having an object-side surface being convex in a paraxial region thereof and an image-side surface being concave in a paraxial region thereof, the image-side surface of the fourth lens element having at least one convex critical point in an off-axial region thereof;
 wherein a total number of lens elements of the optical photographing lens system is four, both of an absolute value of a focal length of the first lens element and an absolute value of a focal length of the fourth lens element are smaller than both of an absolute value of a focal length of the second lens element and an absolute value of a focal length of the third lens element, an f-number of the optical photographing lens system is Fno, and the following condition is satisfied:

0.8<Fno<2.0.

14. The optical photographing lens system of claim 13, wherein the focal length of the third lens element is f3, the focal length of the fourth lens element is f4, and the following condition is satisfied:

0<|f4/|f3|<0.45.

15. The optical photographing lens system of claim 13, wherein a composite focal length of the first lens element and the second lens element is f12, a composite focal length of the third lens element and the fourth lens element is f34, and the following condition is satisfied:

0.40<f34/f12<1.80.

16. The optical photographing lens system of claim 13, wherein an entrance pupil diameter of the optical photographing lens system is EPD, a central thickness of the second lens element is CT2, and the following condition is satisfied:

7.0<EPD/CT2<20.0.

17. The optical photographing lens system of claim 13, wherein the optical photographing lens system is applicable to infrared wavelengths ranging from 780.0 nm to 1100.0 nm.

18. The optical photographing lens system of claim 13, wherein both an object-side surface and an image-side surface of the second lens element are aspheric and have at least one inflection point, respectively, the object-side surface of the second lens element is convex.

19. The optical photographing lens system of claim 13, wherein the third lens element has an object-side surface being concave in a paraxial region thereof and an image-side surface being convex in a paraxial region thereof.

20. The optical photographing lens system of claim 19, wherein the image-side surface of the third lens element is aspheric and has at least one concave critical point in an off-axis region thereof.

* * * * *